United States Patent
Arcos

(10) Patent No.: US 11,280,633 B2
(45) Date of Patent: Mar. 22, 2022

(54) METHOD AND SYSTEM FOR EVALUATING A DIFFICULTY RATING OF AN OFF-ROAD ROUTE TRAVERSED BY A VEHICLE

(71) Applicant: JAGUAR LAND ROVER LIMITED, Coventry (GB)

(72) Inventor: Francisco Lumbreras Arcos, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 578 days.

(21) Appl. No.: 16/316,180

(22) PCT Filed: Jul. 3, 2017

(86) PCT No.: PCT/EP2017/066520
§ 371 (c)(1),
(2) Date: Jan. 8, 2019

(87) PCT Pub. No.: WO2018/007330
PCT Pub. Date: Jan. 11, 2018

(65) Prior Publication Data
US 2021/0293575 A1   Sep. 23, 2021

(30) Foreign Application Priority Data

Jul. 8, 2016  (GB) ...................... 1611913

(51) Int. Cl.
*G01C 21/00*  (2006.01)
*G06N 5/04*   (2006.01)
(Continued)

(52) U.S. Cl.
CPC ..... *G01C 21/3826* (2020.08); *G01C 21/3837* (2020.08); *G06N 5/04* (2013.01); *G07C 5/008* (2013.01); *G07C 5/0841* (2013.01)

(58) Field of Classification Search
CPC .. G01C 21/3826; G01C 21/3837; G06N 5/04; G07C 5/008; G07C 5/0841
See application file for complete search history.

(56) References Cited

U.S. PATENT DOCUMENTS

2012/0259541 A1   10/2012   Downey et al.

FOREIGN PATENT DOCUMENTS

WO   2012004553   1/2012
WO   2013075072   5/2013
(Continued)

OTHER PUBLICATIONS

Search and Examination Report, GB1611913.3, dated Dec. 16, 2016.
International Search Report and Written Opinion, PCT/EP17/066520, 16 pages.

*Primary Examiner* — Michael J Zanelli
(74) *Attorney, Agent, or Firm* — McCoy Russell LLP

(57) ABSTRACT

A method for determining a difficulty rating associated with the terrain comprised in an off-road route using a vehicle, and a system for carrying out the method are disclosed. The difficulty rating being indicative of the difficulty a vehicle experiences in traversing the terrain. The method is carried out using a vehicle comprising on or more sensors. The method comprises: receiving a request to determine the terrain difficulty; obtaining vehicle sensor data sampled over a preceding period of time whilst the vehicle was traversing the off-road route; analysing the sampled sensor data and determining one or more characteristics associated with the sampled sensor data; predicting the type of terrain traversed by the vehicle on the basis of one or more of the determined one or more characteristics; and calculating the difficulty rating using the one or more determined characteristics and the predicted terrain type.

17 Claims, 8 Drawing Sheets

(51) Int. Cl.
  *G07C 5/00* (2006.01)
  *G07C 5/08* (2006.01)

(56) References Cited

FOREIGN PATENT DOCUMENTS

| | | |
|---|---|---|
| WO | 2013120546 | 8/2013 |
| WO | WO2015/121107 A1 * | 8/2015 |
| WO | WO2015/121108 A1 * | 8/2015 |
| WO | 2016142858 | 9/2016 |

* cited by examiner

Figure 5

METHOD AND SYSTEM FOR EVALUATING A DIFFICULTY RATING OF AN OFF-ROAD ROUTE TRAVERSED BY A VEHICLE

CROSS-REFERENCE TO RELATED APPLICATIONS

This application is a 371 of International Application No. PCT/EP2017/066520, filed Jul. 3, 2017, which claims priority to GB Patent Application 1611913.3, filed Jul. 8, 2016, the contents of both of which are incorporated by reference herein in their entirety.

TECHNICAL FIELD

The present disclosure relates to a vehicle system and particularly, but not exclusively, to a system for determining the difficulty of an off-road route, which information can be shared with other vehicles in a convoy and/or online. Aspects of the invention relate to a method, to a system, to a controller, and to a vehicle.

BACKGROUND

The increasing popularity of off-road and sport utility vehicles (SUV) has resulted in an increase in the popularity of off-road driving, which in turn has resulted in an increase in the number of inexperienced off-road drivers driving off-road. The risks associated with driving on off-road routes are significant when compared to driving on tarmaced roads. The type of terrain (e.g. mud, snow, grass, sand, and rock) being traversed can significantly decrease wheel traction and increase the likelihood of the vehicle becoming stuck. Similarly, with increased slope gradient there is an increase in the likelihood of a vehicle overturning. The difficulty in traversing an off-road route may be further increased by the presence of natural obstacles such as boulders, and bodies of water such as rivers and/or streams. Traditionally, off-road drivers have assessed the difficulty in traversing an off-road route via visual inspection of the route, or driver perception once the route has been driven over. This method of assessing off-road terrain difficulty is very subjective and can lead to the under-estimation of a route's difficulty, which in turn can have grave repercussions.

The present invention has been devised to mitigate or overcome at least some of the above-mentioned problems.

SUMMARY OF THE INVENTION

Aspects and embodiments of the invention provide a method, a system, a controller and a vehicle as claimed in the appended claims.

According to an aspect of the present invention there is provided a method for determining a difficulty rating associated with an off-road route using a vehicle. The difficulty rating is indicative of the difficulty a vehicle experiences in traversing a terrain.

The method comprises: receiving a request to determine the terrain difficulty; obtaining vehicle sensor data sampled over a preceding period of time whilst the vehicle was traversing the off-road route; analysing the sampled sensor data and determining one or more characteristics associated with the sampled sensor data; predicting the type of terrain traversed by the vehicle on the basis of at least one of the one or more determined characteristics; calculating the difficulty rating using the one or more determined characteristics and the predicted terrain type; and outputting a signal indicative of the difficulty rating.

In this way, it is possible, to advantageously determine both the characteristic features of a terrain and an associated difficulty rating, on the basis of vehicle sensor data captured whilst the vehicle is traversing the off-road terrain. The vehicle sensor data may provide information about the state of the vehicle resulting from interaction with the terrain. Furthermore, the present method may be carried out using the existing sensors present in most modern vehicles, and does not require any specialist hardware. Calculating the difficulty rating associated with an off-road route using vehicle sensor data provides a more objective measure of an off-road route's difficulty when compared to the prior art methods.

In certain embodiments the method may be carried out with a processor comprised within a vehicle, such as an Electronic Control Unit of the vehicle.

In an embodiment the method comprises transmitting a signal indicative of any one or more of the calculated difficulty rating and the one or more determined characteristics to a remotely located vehicle in operative communication with the vehicle. In this way it is possible to share data associated with an off-road route between different vehicles. This is particularly useful for use in off-road convoys, where a leading vehicle may share data associated with the off-road route with trailing vehicles in the convoy, and where necessary the trailing vehicles may select an alternative route to avoid any obstacles or other hazards identified in the shared data.

In an embodiment the method comprises uploading any one or more of the calculated difficulty rating and the one or more determined characteristics to a remotely located storage device accessible by one or more remotely located vehicles. Advantageously the remotely located storage device may provide a repository for storing off-road route data generated by different vehicles, which data may subsequently be accessed by different vehicles and used for route planning. Effectively, the remotely located storage device may provide the function of a shared resource accessible to a plurality of different vehicles. Furthermore, the collating of off-road route data generated by different vehicles relating to the same route, may be used to improve the accuracy and confidence of the stored route data.

In an embodiment the method comprises: sampling the vehicle sensor data; associating the sampled sensor data with time information, wherein each sampled sensor data point is associated with a corresponding time coordinate associated with the time that the sampled sensor data point was sampled, such that the sensor data forms a data time series and; storing the sensor data in a memory device operatively coupled to the vehicle, for subsequent access. Associating time information with the sampled sensor data enables a data time series of the sampled sensor data to be generated, which provides the benefit of being able to observe how the sampled data changes over time as the vehicle traverses the off-road route. On the basis of the observed time variance of sensor data it may be possible to determine characteristic features of the off-road terrain. In many instances it is possible to derive more information regarding the terrain of an off-road route by observing how vehicle sensor data varies than from absolute sensor data values.

In an embodiment the method may comprise associating location information with the sensor data, such that each sampled data point comprised within the sensor data is associated with location information associated with the location where the sampled data point was sampled. This enables the sampled sensor data to be associated with specific geographic locations. In this way it is possible to be aware not only of the characteristics of the off-road terrain, but also where along the off-road route obstacles may be located. In certain embodiments the location information may be provided by a Global Positioning System, or any other location identification system.

In an embodiment, determining the one or more characteristics associated with the sampled sensor data may comprise: estimating a rolling resistance force experienced by one or more wheels of the vehicle, the rolling resistance being estimated by calculating a difference between a calculated tractive force experienced by the vehicle, the aerodynamic drag experienced by the vehicle, and the inertial resistance of the vehicle. Information regarding the type of terrain being traversed may be derived from rolling resistance data, since different terrain types are associated with different rolling resistances. For example, this may enable soft sand to be distinguished from rocky terrain.

In some embodiments the tractive force may be calculated on the basis of the produced engine torque, a gearbox state of the vehicle, and a state of the vehicle's differential.

In some embodiments any one or more of the produced engine torque, gearbox state, or differential state may be obtained from an Engine Management Unit or an Electronic Control Unit comprised in the vehicle.

In an embodiment analysing the sampled sensor data and determining the one or more characteristics associated with the sampled sensor data may comprise: identifying one or more events associated with a loss of vehicle wheel traction in the sampled sensor data; and estimating a surface friction value experienced by the vehicle immediately prior to the loss of vehicle wheel traction for the one or more identified events. The surface friction may provide further information regarding the type of terrain being traversed.

In an embodiment the sampled vehicle sensor data may comprise longitudinal and lateral vehicle acceleration data, and the one or more events associated with the loss of wheel traction may be identified by monitoring the lateral and longitudinal acceleration sensor data.

In an embodiment the sampled vehicle sensor data may comprise data generated by a stability control system comprised within the vehicle, and the one or more events associated with the loss of vehicle wheel traction may be identified by monitoring data generated by the stability control system. Where available, the stability control system provides a convenient means for identifying events associated with a loss of wheel traction.

In an embodiment determining the one or more characteristics associated with the sampled sensor data comprises determining a roughness of the terrain comprised in the off-road route. The roughness of a terrain is one factor which can considerably increase the difficulty associated with traversing the terrain in a vehicle, and thus knowledge of the sections of an off-road route associated with very rough terrain is beneficial in determining the difficulty rating associated with the route. Furthermore, this information can be used by other vehicles during route planning, and if necessary an alternative route may be selected in order to avoid particularly rough terrain.

In an embodiment the sampled vehicle sensor data may comprise suspension displacement data. Determining the roughness of the terrain comprised in the off-road route may comprise: analysing the suspension displacement data; determining one or more cross articulation data, the cross articulation data being associated with a difference in the displacement of diametrically opposed vehicle suspension; and determining the roughness of the terrain on the basis of the cross articulation data. Vehicle cross articulation data provides a convenient way of determining the roughness of off-road terrain. For example, it enables rocky terrain to be distinguished from grass terrain.

In an embodiment the sampled vehicle sensor data may comprise vehicle roll data, and determining the one or more characteristics associated with the sampled sensor data may comprise determining a roll angle associated with the vehicle, the roll angle being associated with a side slope of the traversed terrain. Vehicle roll angle facilitates identification of portions of an off-road route, which may comprise side slope, which can prove difficult to traverse with a vehicle. Having foresight of such route sections means that if necessary evasive action may be pursued.

In an embodiment the sampled vehicle sensor data may comprise vehicle pitch data, and determining the one or more characteristics associated with the sampled sensor data may comprise determining a pitch angle associated with the vehicle, the pitch angle being associated with a slope of the traversed terrain. Pitch angle may facilitate the identification of slopes comprised along the off-road route, which can depending on their steepness can provide significant obstacles for a vehicle.

In an embodiment the sampled vehicle sensor data may comprise vehicle yaw data, and determining the one or more characteristics associated with the sampled sensor data may comprise determining a yaw angle associated with the vehicle. Monitoring of the vehicle yaw angle can advantageously facilitate the identification of slip events, and in particular the loss of wheel traction, and therefore may be indicative of terrain features such as terrain type. In addition, monitoring the vehicle yaw angle can also be indicative of a driver's off-road driving style. For example, if the driver power slides and/or drifts the vehicle in bends.

In an embodiment the sampled vehicle sensor data may comprise any one or more of: ambient temperature data; atmospheric pressure data; rain sensor data; ambient light sensor data; accelerator pedal position data. Ambient temperature data, atmospheric pressure data, rain sensor data and ambient light sensor data may provide information regarding the ambient conditions under which sensor data may have been captured by a vehicle, which conditions may increased the difficulty associated with a particular off-road route. This information is particularly useful when comparing the data captured by two different vehicles for the same off-road route. For example, traversing an off-road route in wet conditions in poor visibility may be significantly more difficult than traversing the same route in dry conditions with good visibility. Accordingly, knowledge of the ambient conditions in which specific sensor data associated with a particular off-road route were captured means that a more objective comparison of the data may be carried out. Furthermore, in certain embodiments a different difficulty rating may be calculated for an off-road route depending on the ambient conditions. In this way, when previously captured off-road route data is used for route planning, a more accurate difficulty rating may be provided to a driver of a vehicle depending on the ambient conditions in which the off-road route may be traversed. This may be achieved by providing, to the driver, the difficulty rating whose associated ambient conditions are most similar to the current ambient conditions of the route. This helps to reduce the risk that the driver is caught out by an off-road route being significantly more difficult than anticipated due to the current ambient conditions differing from the ambient conditions under which the difficulty rating was calculated.

In an embodiment a vehicle capability index indicative of the off-road capabilities of the vehicle may be included in the difficulty rating calculation. This helps to account for the different off-road capabilities associated with different vehicles. A particular off-road route may be easier or more difficult for a specific vehicle depending on its off-road capabilities, when compared to the difficulty experienced by another vehicle with different off-road capabilities. Advantageously, including a specific vehicle's off-road capability index in the difficulty rating calculation, means that the difficulty rating associated with a specific off-road route may be customised for each vehicle on the basis of its off-road capabilities. This reduces the risk that a vehicle with limited off-road capabilities underestimates the difficulty associated with a particular off-road route due to a difficulty rating calculated on the basis of a vehicle having superior off-road capabilities.

According to another aspect of the invention there is provided a system for determining a difficulty rating associated with the terrain comprised in an off-road route, the difficulty rating being indicative of the difficulty a vehicle experiences in traversing the terrain. The system may comprise a processor suitable for receiving sensor data from one or more sensors arranged to capture sensor data regarding a state of the vehicle over a period of time as it traverses the off-road route. The processor may be arranged to: analyse the captured sensor data and to determine one or more characteristics associated with the captured sensor data; predict the type of terrain traversed by the vehicle on the basis of one or more of the determined one or more characteristics; calculate the difficulty rating using the one or more determined characteristics and the predicted terrain type; and output a signal indicative of the difficulty rating of the off-road route. This aspect of the invention and associated embodiments provide the same advantages set out previously in relation to the preceding aspect and its associated embodiments.

In an embodiment the system may comprise: a transmitter arranged to transmit any one or more of the calculated difficulty rating and the one or more determined characteristics to a remotely located vehicle. This enables the system to share data including characteristic data and terrain difficulty rating data with other remotely located vehicles.

In an embodiment the system may comprise a location positioning system arranged to record location data of the vehicle whilst the vehicle traverses the off-road route. The processor may be arranged to associate the recorded location data with the captured sensor data.

In an embodiment the characteristics associated with the captured sensor data may comprise rolling resistance force. The processor may be arranged to receive vehicle engine torque data, vehicle gearbox data, and vehicle differential settings data from an Engine Management Unit of the vehicle or from an Electronic Control Unit of the vehicle. The processor may be configured to: calculate the torque delivered to the wheels of the vehicle using the vehicle engine torque data, the vehicle gearbox data and the differential settings; convert the calculated torque delivered to the wheels of the vehicle into tractive force; calculate the aerodynamic drag of the vehicle on the basis of the vehicle speed and the aerodynamic shape of the vehicle; calculate the force of inertia of the vehicle on the basis of the vehicle's mass and acceleration; and calculate the estimated rolling resistance force experienced by the wheels of the vehicle, by subtracting the aerodynamic drag and force of inertia of the vehicle from the tractive force.

In an embodiment the characteristics associated with the captured sensor data may comprise surface friction. The processor may be arranged to receive data from a traction control system comprised in the vehicle, and to receive longitudinal and lateral acceleration data from one or more accelerometers comprised in the vehicle. The processor may be configured to: identify one or more vehicle slip events associated with a loss of traction of the vehicle from the received traction control system data; determine the lateral and longitudinal acceleration of the vehicle associated with each identified slip event; and calculate an estimate of the surface friction value experienced by the vehicle just prior to each identified slip event on the basis of the determined lateral and longitudinal acceleration of the vehicle associated with the slip event.

In an embodiment the characteristics associated with the captured sensor data may comprise terrain roughness. The processor may be configured to receive suspension displacement data from one or more suspension sensors comprised in the vehicle, and the processor may be configured to: determine vehicle cross articulation data from the received suspension displacement data, the cross articulation data being associated with a difference in the displacement of diametrically opposed vehicle suspension; and determine the roughness of the terrain on the basis of the determined cross articulation data.

In an embodiment the characteristics associated with the captured sensor data may comprise vehicle roll angle, the roll angle being associated with a side slope of the traversed terrain. The processor may be configured to receive accelerometer sensor data from one or more accelerometer sensors comprised in the vehicle. The processor may additionally be configured to: determine a vehicle roll angle from the received accelerometer sensor data; and determine the side slope on the basis of the determined vehicle roll angle.

In an embodiment the characteristics associated with the captured sensor data may comprise vehicle pitch angle, and the pitch angle may be associated with a slope of the traversed terrain. The processor may be configured to receive accelerometer sensor data from one or more accelerometer sensors comprised in the vehicle. The processor may be additionally configured to: determine a vehicle pitch angle from the received accelerometer sensor data; and determine the slope on the basis of the determined vehicle pitch angle.

In an embodiment the characteristics associated with the captured sensor data may comprise vehicle yaw angle. The processor may be configured to receive accelerometer sensor data from one or more accelerometer sensors comprised in the vehicle. The processor may be further configured to: determine a vehicle yaw angle from the received accelerometer sensor data.

In an embodiment the characteristics associated with the captured sensor data may comprise vehicle accelerator pedal position data, and the processor may be configured to: determine the accelerator pedal position associated with an identified vehicle slip event from pedal position data received from an Engine Management Unit of the vehicle.

In an embodiment the system may comprise a remotely located database arranged to receive the vehicle sensor data from the vehicle, via a shared communications network.

In an embodiment the system may comprise a mobile processing device arranged to receive the vehicle sensor data from the vehicle. For example, the mobile processing device may comprise any one or more of: a smartphone; a tablet; a portable computer; or any other portable device comprising processing capabilities.

According to a further aspect of the invention there is provided, a controller for determining a difficulty rating associated with an off-road route, the difficulty rating being indicative of the difficulty a vehicle experiences in traversing a terrain, the controller configured to: receive sensor data comprising a state of the vehicle over a period of time as it traverses the off-road route; analyse the captured sensor data and to determine one or more characteristics associated with the captured sensor data;

predict the type of terrain traversed by the vehicle on the basis of at least one of the one or more determined characteristics; calculate the difficulty rating using the one or more determined characteristics and the predicted terrain type; and output a signal indicative of the difficulty rating of the off-road route.

A further aspect of the invention provides for a vehicle comprising the aforementioned system, and/or configured to carry out the aforementioned method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

For the purposes of this disclosure, and for the avoidance of doubt, it is to be understood that the Electronic Control Unit described herein can comprise a control unit or computational device having one or more electronic processors. As used herein, the term "control unit" will be understood to include both a single control unit or controller and a plurality of control units or controllers collectively operating to provide the required control functionality. A set of instructions could be provided which, when executed, cause the controller(s) or control unit(s) to implement the method described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

BRIEF DESCRIPTION OF THE DRAWINGS

One or more embodiments of the invention will now be described, by way of example only, with reference to the accompanying drawings, in which:

FIG. 5 is a summary of the different characteristic features which are included in the terrain difficulty rating calculation for each different type of identified terrain type;

DETAILED DESCRIPTION

Systems and methods in accordance with embodiments of the present invention may be used in several different contexts. In particular, the characteristic features of an off-road route and an associated difficulty rating calculated with a vehicle, may be shared with other remotely located vehicles. For example, this might comprise storing captured data associated with the characteristic features of an off-road route and/or an associated difficulty rating in a remotely located networked storage device, which is accessible to other vehicles, in order to generate a database of data associated with various different off-road routes. In this regard, the remotely located storage device provides the function of a central repository for storing off-road route data calculated by a plurality of different vehicles. Sourcing data associated with a specific off-road route from a plurality of different vehicles is advantageous in that it improves the confidence and accuracy associated with the stored off-road route data.

Calculated characteristic features and difficulty ratings of an off-road route may also be shared directly between vehicles. One context in which this may prove particularly useful is within off-road vehicle convoys.

Further details of specific embodiments of the systems and methods of the present invention are set out below.

Figure 1:
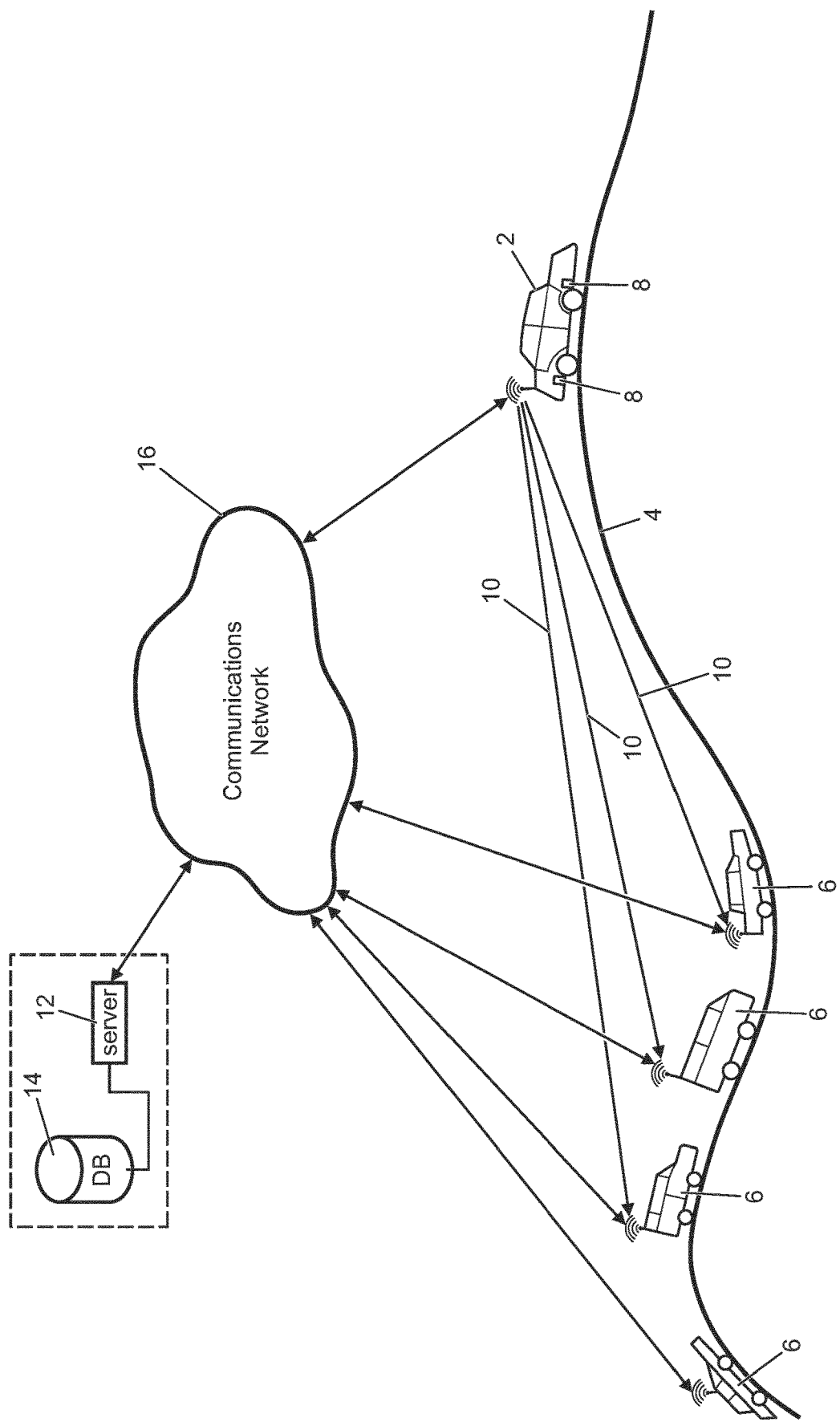
FIG. 1 is a schematic overview illustrating how information relating to an off-road route captured by a vehicle may be shared with other remotely located vehicles, in accordance with an embodiment of the invention.

FIG. 1 is a schematic overview illustrating a leading vehicle 2 comprised within a vehicle convoy, traversing off-road terrain 4. In addition to the leading vehicle 2, the convoy is comprised of one or more trailing vehicles 6.

The leading vehicle 2 is configured with a plurality of vehicle sensors 8, and as the leading vehicle 2 traverses the off-road terrain 4, the vehicle sensors 8 capture a plurality of sensor data. The sensors may relate to, but are not limited to, conventional vehicle sensors, vehicle control system sensors, and/or any other sensors providing data relating to a current state of the vehicle or of the ambient environment. A non-limiting illustrative example of the vehicle sensors may comprise any one or more of: suspension sensors, brake sensors, temperature sensors, rain sensors, and/or traction control sensors. The sensor data may be captured continuously or at discrete temporal intervals for the duration of the leading vehicle's off-road journey. As the sensor data is captured it is time stamped, to form a data time series. The sensor data may additionally be associated with location data obtained, for example, using a Global Positioning System (GPS), or any other location recognition system available to the leading vehicle 2, which data can be used to identify the leading vehicle's off-road route. In this way, the captured data time series is additionally associable with location data of the leading vehicle 2. The data time series is subsequently analysed in order to determine a state of the leading vehicle and how it varies over the duration of the off-road journey. By analysing the state of the leading vehicle 2, and how the state varies over time as the off-road terrain 4 is traversed, it is possible to determine a set of characteristic features associated with the traversed off-road terrain 4 from the captured sensor data. In turn, the set of characteristic features may be used by the leading vehicle 2 to calculate a difficulty rating associated with the traversed off-road terrain 4. The leading vehicle 2 may be configured to associate the determined characteristic features with the vehicle location data, such that the geospatial location of the determined characteristic features are defined along the off-road route. In certain embodiments, this may comprise overlaying the determined characteristic features on the vehicle location data, along with the calculated difficulty rating associated with the off-road route.

The route information associated with the off-road route taken by the leading vehicle 2, including the determined characteristic features associated with the route and the calculated difficulty rating, may be shared with the trailing vehicles 6 in the convoy, to inform the trailing vehicles 6 of the characteristics and difficulty of the upcoming off-road terrain. On the basis of this data shared by the leading vehicle 2, the trailing vehicles 6 may decide to take an alternative route in the event that the upcoming route is considered too difficult for the trailing vehicles 6. Data may be shared between the leading vehicle 2 and one or more of the trailing vehicle's using a point-to-point communication means 10. For example, the communication means 10 may comprise a dedicated short-range communications (DSRC).

As mentioned previously, alternatively or additionally, off-road route information comprising the determined characteristic features and the calculated difficulty rating may be uploaded to a remotely located networked server 12, comprising a database 14 of off-road vehicle routes and associated characteristic feature data and difficulty ratings, via a shared communications network 16, such as but not limited to the internet and/or cellular networks. Data stored in the remotely located networked server may be remotely accessible to other vehicles (not shown) configured with means for communicating with the communications network 16, including the trailing vehicles 6. In turn each one of the vehicles 6 may also capture vehicle sensor data and calculate characteristic features associated with the off-road route, along with a calculated difficulty rating. In this way, it is possible to collate a library of vehicle generated off-road route information, from a plurality of different vehicles, which is accessible to other vehicles. It is envisaged that the database 14 of off-road vehicle routes may be accessed by the drivers of other vehicles prior to setting out on a specific off-road route in order to assess whether the characteristics of the off-road route are suited to the capabilities of the driver's vehicle. This assessment may be carried out on the basis of either one or more of the characteristic features associated with the off-road route, and/or the associated difficulty rating. By collating off-road route data from a plurality of different vehicles, it is possible to obtain a more confident analysis of the difficulty associated with an off-road route. To this end, it is envisaged that the server 12 operatively coupled to the off-road route database 14 may be provided with a processor enabling it to analyse the collated off-road route data in order to generate a more confident difficulty rating, and in some embodiments in order to calculate characteristic features associated with the off-road route having an associated greater confidence value. This is in line with accepted statistics principles in which it is appreciated that the greater a set of available data, the more confident one can be of the accuracy of any derived characteristics.

In certain embodiments, it is envisaged that the difficulty rating associated with a specific off-road route may also account for the off-road capabilities of the vehicle used to capture the sensor data. Similarly, for example, the difficulty rating displayed to one of the trailing vehicle's 6 may be customised to the off-road capabilities of the trailing vehicle 6. In this way, it is possible to account for the different off-road capabilities associated with different vehicles, reduces the risk that a vehicle attempting to traverse an off-road route on the basis of a difficulty rating calculated from sensor data captured by a vehicle having better off-road capabilities, and places itself in a compromising situation. Thus, it is advantageous to account for the different off-road capabilities associated with different types of vehicles, to reduce the risk of less capable vehicles placing themselves in compromising situations. In such embodiments it is envisaged that the difficulty rating associated with an off-road route may also be customised to the specific vehicle's off-road capabilities. This may be achieved in several different ways. For example, one way in which it could be achieved is by recalculating the difficulty rating for each vehicle's off-road capabilities, and providing a customised difficulty rating to each vehicle. The recalculation could be carried out locally to each vehicle, or remotely from the vehicle. In this way, the difficulty rating associated with an off-road route is calibrated to each specific vehicle's off-road capabilities.

An alternative way in which the different off-road capabilities of different vehicles may be compensated for, is by defining a maximum off-road terrain difficulty rating each vehicle is capable of traversing. For example, a difficulty rating scale from 1 to 10 may be defined, and each vehicle, dependent on its off-road capabilities, is allocated a maximum difficulty rating value within this scale. Should a driver wish to carry out an off-road route associated with a more difficult difficulty rating than the vehicle's allocated maximum difficulty rating, then the driver of the affected vehicle may be provided with a warning highlighting the danger of proceeding with the off-road route.

In this way, each individual can receive a difficulty map which shows the difficulty ratings with respect to a specific vehicle the individual drives rather than providing one general map of difficulty rating to all the users.

In the ensuing discussion of embodiments of the invention, the vehicle configured to carry out the present methods may interchangeably be referred to as the 'leading vehicle' or simply the 'vehicle', and any reference to the vehicle 2 of FIG. 1 is not to be construed as implying that the vehicle 2 is necessarily travelling in a convoy, since as the preceding discussion has shown the vehicle 2 may equally be configured to upload calculated characteristic features associated with an off-road route and/or an associated terrain difficulty rating to a remotely located database 14, accessible to other operatively connected vehicles 6.

Figure 2A:
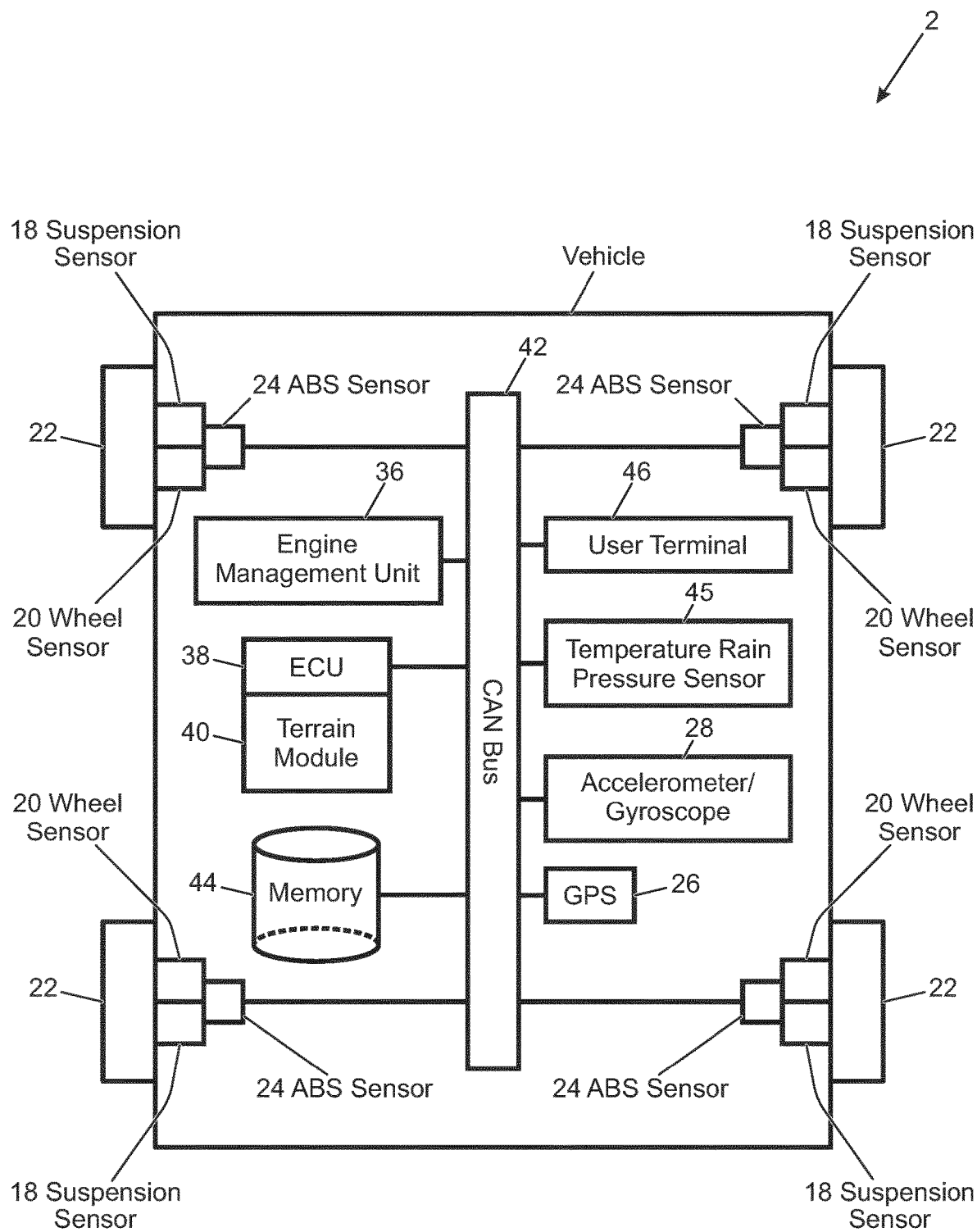
FIG. 2a is a schematic overview of the modular components comprised in a vehicle configured to capture terrain data and to share it with other vehicles, as illustrated in FIG. 1, in accordance with an embodiment of the invention.

FIG. 2a is a schematic illustration of the sensors and functional components comprised within a vehicle configured to capture sensor data associated with an off-road route, such as the vehicle 2 of FIG. 1. The illustrated sensors and functional components enable the vehicle to determine the characteristic features associated with traversed off-road terrain, in accordance with an embodiment of the invention. It is to be appreciated that the illustrated sensors and functional components are not to be considered limiting and instead are illustrative examples only. The person skilled in the art will appreciate that the majority of the illustrated sensors are conventional sensors present in the majority of currently manufactured motor vehicles.

Figure 2B:
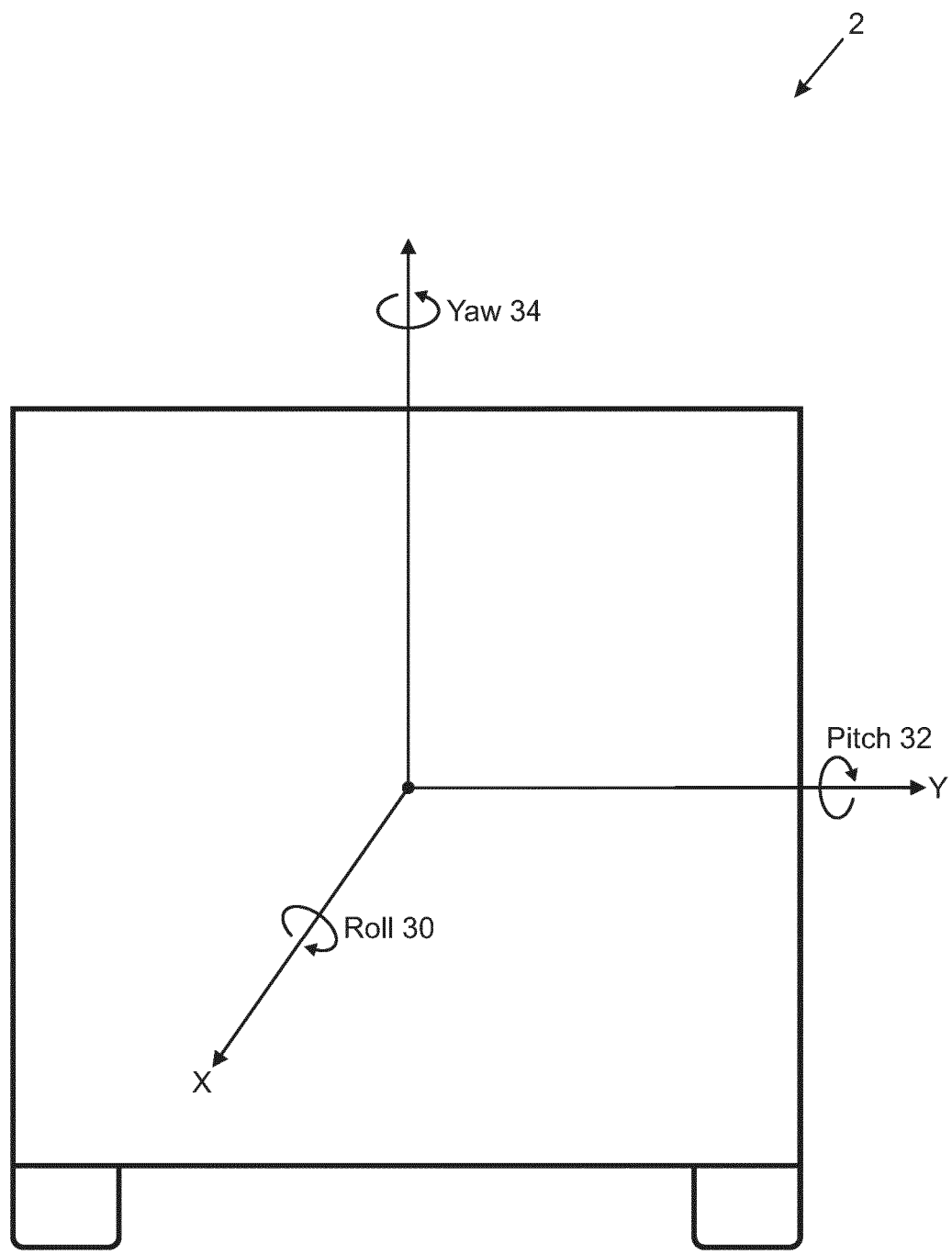
FIG. 2b is a front-view schematic of the vehicle of FIG. 2a, illustrating the different axes of rotation of the vehicle.

Suspension sensors 18 provide information regarding the displacement of each suspension coupled to each vehicle wheel. This measured data may be used to infer the roughness of the traversed off-road route. The wheel sensors 20 may provide information regarding the speed of each wheel 22. The ABS (Anti-lock Braking System) sensors 24 may provide information indicating when a loss of traction event may be near to occurring, from which it may be possible to estimate the type of terrain being traversed. For example, when braking on a very cold surface such as black ice or similar, it is highly likely that an ABS system will be activated in an attempt to maintain traction between the wheels 20 and the terrain surface. Accordingly, on the basis of the frequency with which the ABS sensor 24 is activated during a journey, it may be possible to determine how slippery the terrain surface is, and whether the vehicle is traversing over snow or ice, for example. As mentioned previously, vehicle location information may be provided by a GPS sensor. One or more accelerometers and/or gyroscopes 28 may be provided enabling vehicle roll, pitch and/or yaw to be measured, in addition to longitudinal, lateral and vertical acceleration of the vehicle 2. FIG. 2b clearly illustrates the different axes of rotation of the vehicle 2, corresponding respectively with vehicle roll 30, pitch 32 and yaw 34. Acceleration along the x-axis is defined herein as longitudinal acceleration, acceleration along the y-axis is defined as lateral acceleration, and acceleration along the z-axis is defined as vertical acceleration. Turning back to FIG. 2a, data captured with the one or more accelerometers and/or gyroscopes 28 may be used to provide information regarding the slope of the traversed terrain, for example. A very hilly or mountainous route is likely to be associated with significant variances in vehicle pitch 32, yaw 34 and/or roll 30. Data regarding engine performance, such as the generated torque may be determined from an Engine Management Unit 36. Similarly, the driver's pedal input (i.e. how heavily the driver is activating the brake pedal or accelerator and for how long) may also be determined from the Engine Management Unit 36. Further data may also be captured from any one or more of the vehicle's Electronic Control Units (ECU) 38. It is to be appreciated that whilst FIG. 2a illustrates a single ECU, the vehicle 2 may comprise a plurality of ECUs. Where available, this may also comprise data relating to a vehicle terrain module 40. Vehicle terrain modules are often electronic control systems configured to customise a vehicle's stability, differential and/or traction control on the basis of either an automatically determined terrain type being traversed, or on the basis of a manually selected terrain vehicle mode of operation selected by the driver. For example, many off-road vehicles and SUVs comprise different driver-selectable terrain settings, which configure vehicle handling on the basis of a selected terrain mode of operation. Data regarding the type of terrain being traversed may also be obtained from such systems. The vehicle 2 may also comprise ambient temperature, pressure and/or rain sensors 45, which provide data regarding the environmental conditions the vehicle 2 is operating in, including ambient temperature and pressure data, and whether the vehicle 2 is being operated in wet conditions. The aforementioned sensors and control units may all be operatively coupled to a CAN (Controller Area Network) bus 42. As the person skilled in the art will appreciate the CAN bus 42 enables the different sensors and control units to communicate with one another without requiring an additional host computer. A storage device 44 may also be operatively coupled to the CAN bus 42, configured to store the data generated by the different sensors and/or control units. Calculation of the characteristic features may be carried out by the ECU 38, from the captured sensor data.

In certain embodiments, it is envisaged that the calculation of the characteristic features may be initiated upon receipt of a driver input requesting computation of the characteristic features and/or the difficulty rating associated with the traversed off-road route. The driver input may be provided via a User Terminal 46. Furthermore, in such embodiments, the ECU 38 may be configured upon receipt of the driver input, to retrieve and analyse all sensor data captured within a preceding predetermined period of time (e.g. the previous hours' worth of captured sensor data), from the storage device 44 in order to calculate the characteristic features and difficulty rating associated with the previously traversed off-road route. In certain embodiments, it is envisaged that the driver input may also specify the preceding period of time of sensor data requiring analysis. For example, the driver input may indicate that the preceding 15 minutes of captured sensor data is to be analysed, or the preceding 30 minutes of captured sensor data.

Figure 3:
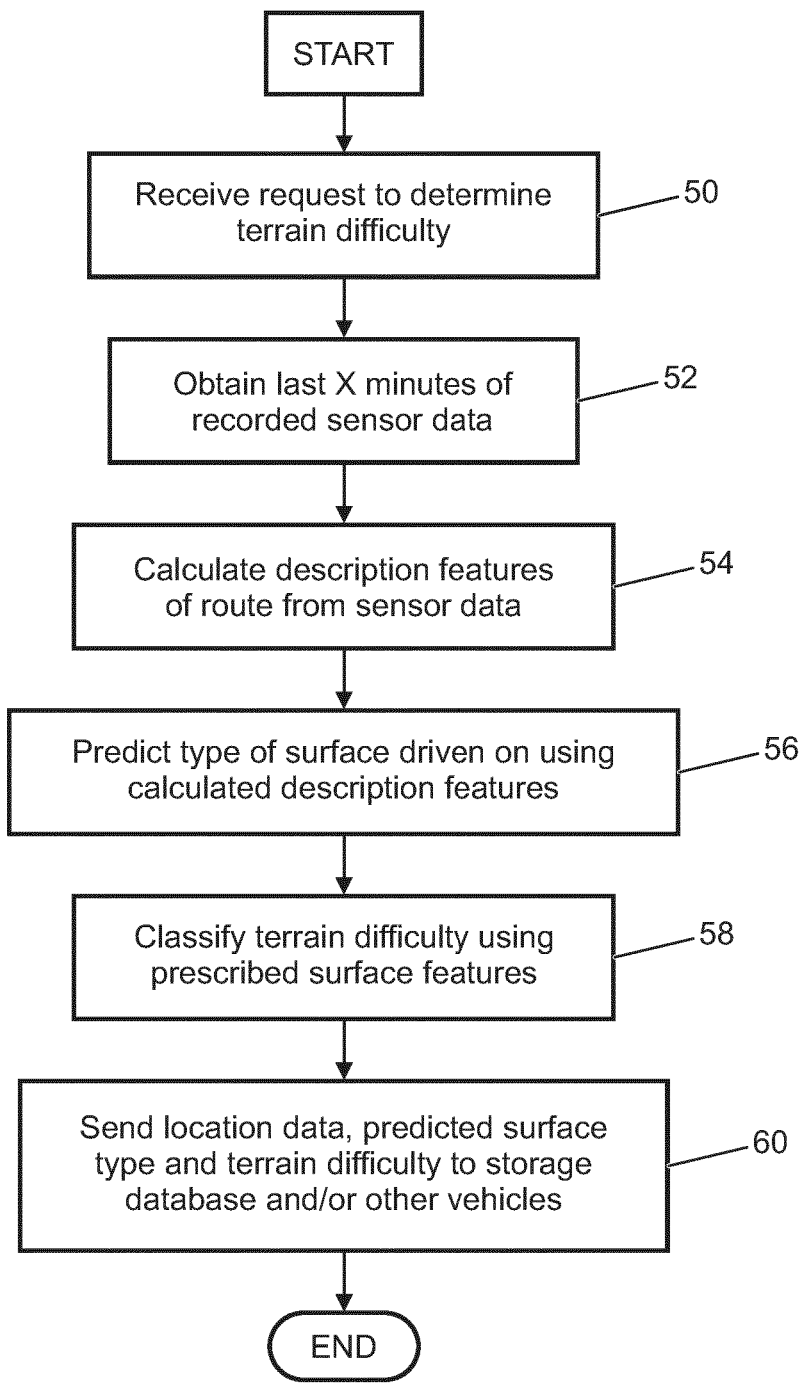
FIG. 3 is a process flow chart illustrating the method carried out by the vehicle of FIGS. 2a and 2b in capturing off-road terrain data and calculating a difficulty rating associated with the traversed off-road route, in accordance with an embodiment of the invention.

FIG. 3 is a process flow chart illustrating a method carried out by the vehicle 2 in calculating the difficulty rating associated with the traversed off-road route. The method is initiated by receipt of a request, at step 50. In an embodiment, the request is from the driver to determine the difficulty rating of the traversed terrain, via the user terminal 46 at the ECU 38. In another embodiment, the method is automatically initiated. The ECU 38 subsequently obtains sensor data recorded during the preceding period of time from the memory 44, at step 52. The preceding period of time may either be predetermined or may be driver defined in the request message received at step 50. Upon receipt of the sensor data, the ECU 38 proceeds to calculate characteristic features associated with the traversed off-road terrain, at step 54. Further specifics regarding the calculated characteristic features, in accordance with an embodiment, are discussed in the ensuing description below. On the basis of the calculated characteristic features, the ECU 38 predicts the type of terrain being traversed, at step 56. In certain embodiments, the captured sensor data is divided into subsets of equal time duration, and each subset is analysed to predict the type of terrain associated with the subset. This is particularly useful for identifying the different types of terrain that the vehicle 2 may have traversed during its off-road journey. In particular, any subsets of captured sensor data that are identified as being associated with tarmaced road are discarded to avoid them unduly impacting the subsequently calculated difficulty rating associated with the off-road route. In particular, it is envisaged that sensor data associated with tarmaced road will decrease the subsequently calculated difficulty rating, thus in order to more objectively represent the true difficulty of an off-road route, all sensor data associated with tarmaced sections of the route may be discarded. The difficulty rating associated with the off-road route is calculated at, step 58, by the ECU 38. The calculated difficulty rating, and in certain embodiments also the characteristic features associated with the off-road route, and associated GPS information are subsequently forwarded to the remotely located vehicles 6, and/or uploaded for storage in the off-road route database 14, at step 60.

Further details of the calculated characteristic features of the off-road route, in accordance with embodiments of the present invention, are now discussed below. In the ensuing discussion the characteristic features associated with an off-road route will be designated as $F_i$ where i represents any positive integer, and $F_i$ is the $i^{th}$ characteristic feature. The person skilled in the art will appreciate that the below provided characteristic features are not limiting, and are provided for illustrative purposes only. In alternative embodiments it is envisaged that other characteristic features may be determined, on the basis of data captured with the sensors available to the vehicle.

In the ensuing description the following characteristic features are calculated from captured vehicle sensor data: rolling resistance force estimation, surface friction estimation, road roughness estimation, vehicle roll, vehicle pitch, ambient temperature and atmospheric pressure, and vehicle yaw rate. These characteristic features are used to identify and classify the type of terrain being traversed (step 56 of FIG. 3), prior to calculating the associated route difficulty rating (step 58 of FIG. 3). Additionally, the following additional characteristic features may be included in the difficulty rating calculation: rain sensor data, light sensor data, accelerator pedal position data, off-road cruise control activation indicator data, and vehicle capability index. Further details of the aforementioned characteristic features are discussed below.

Rolling Resistance Force Estimation

The rolling resistance may provide important information about the type of terrain being traversed, and may be determined from the Engine Management Unit 36. In particular, the rolling resistance force $RR_{est}$ may be estimated on the basis of the produced engine torque multiplied by the gearbox and differential settings, which enables the torque delivered to the vehicle wheels 22 to be determined. The gearbox and differential settings may be obtained from the Engine Management Unit 36 and/or from the ECU 38. The torque delivered to the vehicle wheels may subsequently be converted to tractive force. The rolling resistance force $RR_{est}$ may then be estimated by deducting the aerodynamic drag and the vehicle's inertial force from the tractive force, in accordance with the following equation:

$$RR_{est} = F_{Traction} - F_{Aero\ Drag} - F_{Inertial} \qquad \text{eq. 1}$$

where $F_{Traction}$ is the calculated tractive force, $F_{Aero\ Drag}$ is the aerodynamic drag force, and $F_{Inertial}$ is the force of inertia associated with the vehicle traversing the off-road route. $F_{Aero\ Drag}$ may be calculated using the average vehicle speed, in combination with knowledge of the aerodynamic shape of the vehicle. Similarly, $F_{Inertial}$ may be calculated from knowledge of the vehicle's mass and acceleration, which information may be obtained from the one or more accelerometer sensors 28. The rolling resistance force $RR_{est}$ may be estimated periodically or continuously across the captured sensor data series, in order to generate a $RR_{est}$ time series, which shows how the estimated rolling resistance varies over time as the vehicle traverses the off-road terrain.

In certain embodiments, from the generated $RR_{est}$ time series the following three different rolling resistance values may be calculated and stored in the vehicle memory 44: the maximum estimated $RR_{est}$ value (denoted $F_1$); the average $RR_{est}$ value (denoted $F_2$); and the observed standard deviation of $RR_{est}$ over the time series (denoted $F_3$). The retained characteristic features associated with the estimated rolling resistance force time series are summarised in Table 1 below.

TABLE 1

Characteristic Features extracted from Rolling Resistance Estimation

| Feature $F_i$ | Definition |
| --- | --- |
| $F_1$ | Max ($RR_{est}$) |
| $F_2$ | Average ($RR_{est}$) |
| $F_3$ | Standard Deviation ($RR_{est}$) |

The maximum estimated $RR_{est}$ value is retained as this is indicative of the event with the largest rolling resistance encountered on the off-road route, and thus may correlate to a significant obstacle located on the route. For example, it could correlate with a portion of the off-road route associated with very soft sand.

The average $RR_{est}$ value is also retained, wherefrom the standard deviation $RR_{est}$ may be calculated. The standard deviation $RR_{est}$ indicates whether the terrain associated with high rolling resistance values occurs frequently, or infrequently. The standard deviation $RR_{est}$ helps to place the event associated with the maximum estimated $RR_{est}$ into context. In other words, it can indicate whether the event associated with the maximum estimated $RR_{est}$ is a one-off event or not.

Surface Friction Estimation

An estimation of surface friction along the traversed off-road route may facilitate identification of the type of terrain being traversed (e.g. grass, sand etc.). Using sensor data captured with the vehicle's stability and traction control systems (e.g. the ABS sensors 24, and ECU 38) slip events, if present, may be identified in the captured sensor data. Whenever a slip event is identified, both lateral (y-axis) and longitudinal (x-axis) acceleration values are observed. The sensor data may be capture by different systems and/or subsystems of the vehicle. For each identified slip event the surface friction may then be estimated using the following equation:

$$\mu_k = \frac{\sqrt{a_x^2 + a_y^2}}{g} \qquad \text{eq. 2}$$

where $\mu_k$ is the surface friction estimated at a slip event k and k is a positive integer having values k=1, 2, 3 . . . ; $a_x$ is the vehicle acceleration along the x-axis (i.e. longitudinal vehicle acceleration); $a_y$ is the acceleration along the y-axis (e.g. lateral vehicle acceleration); and g is the acceleration due to gravity. The calculated surface friction values form a time series for $\mu_k$ for all identified slip events k. In certain embodiments, from the generated time series for $\mu_k$ the following three estimated characteristic features associated with surface friction are calculated and stored in memory 44: the number of identified slip events k (denoted $F_4$); the minimum estimated surface friction value Min($\mu_k$) (denoted $F_5$); and the average estimated surface friction value Average($\mu_k$) (denoted $F_6$). The retained characteristic features associated with the estimated surface friction are summarised in Table 2 below.

TABLE 2

Characteristic Features extracted from Surface Friction Estimation

| Feature $F_i$ | Definition |
| --- | --- |
| $F_4$ | Number of slip events |
| $F_5$ | Min ($\mu_k$) |
| $F_6$ | Average ($\mu_k$) |

In the absence of any identified slip events, characteristic features $F_4$, $F_5$, and $F_6$ are set to zero.

Terrain Roughness Estimation

Terrain roughness may be measured by monitoring the vehicle's cross articulation values CA. In the present context cross articulation is understood to be the difference in suspension travel and/or suspension displacement, between two diametrically opposed suspensions. In other words, the cross articulation is the difference in suspension travel/displacement between the rear left suspension and the front right suspension, and between the rear right suspension and the front left suspension. For example, a vehicle which jumps over a bump and whose wheels lose contact with the terrain, would exhibit a very large suspension travel/displacement. The cross articulation values may be calculated using the suspension sensor data captured by the suspension sensors 18. Cross articulation values may be calculated for the duration of the off-road journey on the basis of the captured suspension sensor data, in order to generate a cross articulation value time series. The following characteristic features may be calculated and stored in the memory 44, from the cross articulation time series: the ratio of the maximum cross articulation value (Max(CA)) and the vehicle limit cross articulation value (Vehicle_Limit_CA) (denoted $F_7$); the Fast Fourier Transformed (FFT) three highest peak amplitude cross articulation values (FFT(CA)) (denoted $F_8$, $F_9$, $F_{10}$); and the three highest FFT cross articulation value frequencies (denoted $F_{11}$, $F_{12}$, $F_{13}$). The retained characteristic features associated with the road roughness estimation are summarised in Table 3 below.

TABLE 3

Characteristic Features extracted from Road Roughness Estimation

| Feature $F_i$ | Definition |
| --- | --- |
| $F_7$ | Max(CA)/Vehicle_Limit_CA |
| $F_8$ | 3 highest peaks amplitudes in FFT(CA) |
| $F_9$ | |
| $F_{10}$ | |
| $F_{11}$ | 3 highest peaks frequencies in FFT(CA) |
| $F_{12}$ | |
| $F_{13}$ | |

It is to be appreciated that the extraction of three characteristic features associated with the highest peak amplitudes and highest peak frequencies in FFT(CA) is arbitrary, and in alternative embodiments fewer or a greater number of characteristics may be extracted.

The FFT provides a convenient way of analysing the cross articulation time series in the domain of interest. When analysed in the frequency domain, it helps to identify regions of the off-road route in which the vehicle experienced a high number of events associated which significant suspensions travel—in other words regions of the off-road route in which the terrain may have been very bumpy due to rocks, ruts or other terrain features. Similarly, when analysed in the amplitude domain, it helps to identify regions of the off-road route in which the vehicle experienced the largest amount of suspension travel. In this way it is possible to distinguish between a region of the route comprising ruts, for example, from a region of terrain comprising a large but otherwise isolated bump.

In vehicles, which do not comprise dedicated suspension sensors 18, suspension travel data may be inferred from vehicle damping system data.

Vehicle Roll

Vehicle roll data may indicate whether the vehicle 2 is being driven on a side slope. Roll data may be obtained from a dedicated vehicle roll sensor (not shown) if present, or from the accelerometer/gyroscope 28 sensors. The roll data is captured for the duration of the off-road route, thus forming a roll data time series. In practice, the captured roll data may be passed through a low pass filter prior to analysis. The low pass filter smooths the captured set of roll data, removing or reducing the effect of any transient signals in the data set. Furthermore, measured lateral vehicle acceleration data may also be used to determine if the vehicle is travelling on a side slope. The following characteristic features may be calculated and stored in memory 44 from the captured roll data time series: the maximum absolute sideslope (Max(abs(Sideslope))) as measured using the low pass filter (LPF) lateral acceleration (denoted $F_{14}$); the three highest peak amplitude FFT Roll Angles (denoted $F_{15}$, $F_{16}$, $F_{17}$); and the three highest peak frequencies in the FFT Roll Angles (denoted $F_{18}$, $F_{19}$, $F_{20}$). The retained characteristic features associated with vehicle roll are summarised in Table 4 below.

TABLE 4

Characteristic Features extracted from Vehicle Roll

| Feature $F_i$ | Definition |
| --- | --- |
| $F_{14}$ | Max(abs(Sideslope)) as measured using LPF lateral acceleration |
| $F_{15}$ | 3 highest peaks amplitudes in FFT(Roll Angle) |
| $F_{16}$ | |
| $F_{17}$ | |
| $F_{18}$ | 3 highest peaks frequencies in FFT(Roll Angle) |
| $F_{19}$ | |
| $F_{20}$ | |

It is to be appreciated that the extraction of three characteristic features associated with the highest peak amplitudes and highest peak frequencies in FFT(Roll Angle) is arbitrary, and in alternative embodiments fewer or a greater number of characteristics may extracted.

The absolute sideslope data is calculated since it is the magnitude, and not the direction of the sideslope that is of interest. Again, the FFT is used to conveniently analyse the calculate data time series in both the frequency and amplitude domains. Analysis of the FFT frequency domain provides knowledge of how frequently a sideslope event occurs along the off-road route, whereas analysis of the FFT amplitude domain facilitates identification of the magnitude of the different sideslope events. In this regard it is important to appreciate that knowledge of the maximum absolute sideslope value only provides information regarding the maximum sideslope encountered along the off-road route. When this information is complemented with the FFT amplitude and frequency analysis, it provides further information regarding how many sideslope events occur along the route, and their magnitude.

Vehicle Pitch

Vehicle pitch data may provide further information regarding the slope of the terrain being traversed. Vehicle pitch data may be obtained via a vehicle pitch sensor if present, and/or via the accelerometer/gyroscope sensors 28. As with the vehicle roll sensor data, the vehicle pitch data is captured for the duration of the off-road route, thus forming a pitch angle data time series. As with the captured vehicle roll data, the captured vehicle pitch data may be passed through a LPF prior to analysis to smooth the captured data. In addition, captured longitudinal acceleration data may also be passed through a LPF filter, and analysed in order to determine whether the vehicle is being driven on a slope. The following characteristic features may be calculated and stored in memory 44 from the captured pitch data time series: the maximum absolute slope (Max(abs(Slope))) as measured using the LPF longitudinal acceleration (denoted $F_{21}$); the three highest peak amplitude FFT Pitch Angles (denoted $F_{22}$, $F_{23}$, $F_{24}$); and the three highest peak frequencies in the FFT Pitch Angles (denoted $F_{25}$, $F_{26}$, $F_{27}$). The retained characteristic features associated with vehicle pitch are summarised in Table 5 below.

TABLE 5

Characteristic Features extracted from Vehicle Pitch

| Feature $F_i$ | Definition |
| --- | --- |
| $F_{21}$ | Max(abs(Slope)) as measured using LPF longitudinal acceleration |
| $F_{22}$ $F_{23}$ $F_{24}$ | 3 highest peaks amplitudes in FFT(Pitch Angle) |
| $F_{25}$ $F_{26}$ $F_{27}$ | 3 highest peaks frequencies in FFT(Pitch Angle) |

As with the characteristic features extracted from vehicle roll, the selection of the three highest peak amplitudes and frequencies in FFT(Pitch Angle) is arbitrary, and in alternative embodiments any positive number of highest peak amplitudes and frequencies may be retained.

The absolute slope data is retained since it is the slope magnitude that is of interest and not the direction of slope. The maximum absolute slope value provides information concerning the maximum slope gradient encountered on the off-road route. As with roll angle, the FFT pitch angle is analysed in both the amplitude and frequency domains, for the same reasons as previously stated in relation to the roll angle.

Ambient Temperature and Atmospheric Pressure

Data regarding the ambient temperature and atmospheric pressure along the off-road route may be provided by the temperature and pressure sensor 45. This data may be used to assess the likelihood of encountering snow and ice, as well as desert sand or driving at high altitude on mountain routes. Temperature and pressure can have an effect on engine performance. It is well documented that driving at very high altitude where the air is relatively thin can impact engine aspiration, and engine performance. Similarly, driving in very low temperatures may also impact engine performance.

As with preceding measurements, it is envisaged that temperature and pressure measurements are taken either periodically or continuously throughout the duration of the off-road journey, which measurements again form a time data series. In order to account for the different sensor sensitivities between different vehicle models, 'normalised' temperature and pressure data is retained. This may be achieved in certain embodiments, by dividing the temperature and/or pressure measurement data by the sensor scale. For example, the temperature and pressure sensor 45 may comprise absolute maximum and minimum predefined temperature and pressure limits, above which values the sensor is unable to take a reliable measurement (in short the measurement boundaries of the sensor). The calculated characteristic features may be the maximum measured temperature value (Max(T)) divided by the difference between the absolute maximum and minimum predefined temperature values ($T_{Max\ Ref}$-$T_{Min\ Ref}$) (denoted $F_{28}$) which is in effect a normalised temperature value; and the ratio of the maximum measured pressure value (Max (P)) to the difference between the absolute maximum and minimum predefined pressure values ($P_{Max\ Ref}$-$P_{Min\ Ref}$) (denoted $F_{29}$), which is a normalised pressure value. The retained characteristic ambient temperature and pressure features are summarised in the table below.

TABLE 6

Characteristic Features extracted from Temperature and Pressure Sensors

| Feature $F_i$ | Definition |
| --- | --- |
| $F_{28}$ | Max (T)/(Tmaxref − Tminref) |
| $F_{29}$ | Max (P)/(Pmaxref − Pminref) |

An advantage of retaining the characteristic temperature and pressure values as summarised in Table 6, is that it means meaningful comparisons may be made between the temperature and pressure measurements made with different vehicles having different sensors associated with different measurement sensitivities.

Vehicle Yaw Rate

Measuring the yaw rate, lateral acceleration and vehicle reference speed enables a data time series for each quantity to be obtained from which a comparison of the actual vehicle yaw rate and the ideal steady state behaviour to be obtained. In particular, a comparison of actual vehicle yaw rate with respect to an ideal steady state yaw rate may help to identify if the rear of the vehicle is losing traction and sliding. This often occurs when, for example power sliding a vehicle or during vehicle drifting. Thus, by comparing actual vehicle yaw rate to an ideal steady yaw state behaviour, it is possible to determine if the vehicle is losing rear wheel traction, which may be indicative of challenging off-road terrain.

In certain embodiments each time series is passed through an LPF to smooth the data time series. The aforementioned quantities may be obtained from respectively accelerometer/gyroscope sensors 28 and the Engine Management Unit 36, and/or from a dedicated yaw sensor if present in the vehicle. The reference yaw rate $Y_{ref}$ may be defined as:

$$Y_{ref} = \frac{\alpha_y}{v_{ref}} \qquad \text{eq. 3}$$

where $a_y$ is the lateral acceleration measured with the accelerometer/gyroscope sensor 28; and $v_{ref}$ is the vehicle speed obtained from the Engine Management Unit 36 or from the ECU 38. In other words, equation 3 is a measure of the expected yaw rate for a given reference speed, when the vehicle is not losing rear wheel traction. The yaw gain $Y_{gain}$ may be calculated as the measured yaw rate $Y_{meas}$ divided by the reference yaw rate $Y_{ref}$:

$$Y_{gain} = \frac{Y_{meas}}{Y_{ref}} \qquad \text{eq. 4}$$

Using equations 3 and 4 on the data time series the following characteristic features may be calculated: the maximum absolute yaw rate (Max(abs(YawRate))) (denoted $F_{30}$); the average absolute yaw rate (Average(abs(YawRate))) (denoted $F_{31}$); the standard deviation of the absolute yaw rate (Standard Deviation(abs(YawRate))) (denoted $F_{32}$); the three highest peak amplitudes in the FFT yaw gain (FFT($Y_{gain}$)) (denoted $F_{33}$, $F_{34}$, $F_{35}$); and the three highest peak frequencies in the FFT yaw gain (denoted $F_{36}$, $F_{37}$, $F_{38}$). The calculated yaw characteristic features are summarised in the table below.

TABLE 7

Characteristic Features extracted from Vehicle Yaw Rate

| Feature $F_i$ | Definition |
|---|---|
| $F_{30}$ | Max(abs(YawRate)) |
| $F_{31}$ | Average(abs(YawRate)) |
| $F_{32}$ | Standard Deviation(abs(YawRate)) |
| $F_{33}$ | 3 highest peaks amplitudes in FFT($Y_{gain}$) |
| $F_{34}$ | |
| $F_{35}$ | |
| $F_{36}$ | 3 highest peaks frequencies in FFT($Y_{gain}$) |
| $F_{37}$ | |
| $F_{38}$ | |

Again, the selection of the three highest peak amplitudes and frequencies of FFT($Y_{gain}$) is arbitrary and in alternative embodiments any positive number of highest peak amplitudes and frequencies may be retained. The FFT is used again as this facilitates the ease of analysing the yaw gain data series in both the frequency and time domains.

As mentioned previously, the below additional characteristic features may be included in the calculation of the terrain difficulty rate, once the terrain type has been identified.

Additional derived Characteristic Features

In certain embodiments, the above derived characteristic features are complemented by additional optional characteristic features, which enable a more accurate calculation of the difficulty rating of the off-road route to be calculated. For example, rain sensor data provided by a vehicle rain sensor, may be used to derive a rain sensor characteristic feature. This feature may be a binary value and indicates whether a subject off-road route was traversed in the rain, which can considerably increase the difficulty associated with traversing an off-road route, since waterlogged terrain often is more difficult to traverse with a vehicle than when dry. The rain sensor characteristic feature (denoted $F_{39}$) may be configured to indicate that an off-road journey was carried out in the rain, should the measured rain sensor data indicate that the presence of rain was detected for longer than a predetermined threshold time value.

Similarly, undertaking an off-road route in poor visibility, such as at night or in fog, can also impact the difficulty associated with an off-road route. In this regard, a light sensor characteristic feature may also be defined on the basis of the vehicle's light sensor readings. The light sensor characteristic may also relate to a binary value. The light sensor characteristic feature (denoted $F_{40}$) may be configured to indicate that an off-road journey was carried out in poor visibility, when the measured light sensor data indicates a light measurement value below a predetermined threshold value for a sustained period of time in excess of a predetermined threshold time period.

It is also appreciated that a driver's off-road driving experience and ability may have a significant effect on the likelihood of the vehicle becoming stuck or otherwise struggling to traverse an off-road route. In order to account for the differences in off-road ability between different drivers it may be necessary to also monitor driver behaviour, and specifically how the vehicle is operated. This may be achieved by monitoring driver pedal operation, and in particular operation of the accelerator (often referred to as the throttle) pedal. Accordingly, in certain embodiments a characteristic feature corresponding to the integral over time of the pedal position (denoted $F_{41}$) may also be calculated. In certain embodiments, pedal position information may be obtained from the Engine Management Unit 36 or from the ECU 38. The maximum pedal position value may also be obtained and used to define a further characteristic feature (denoted $F_{42}$). Similarly, a characteristic feature associated with the average pedal position value (denoted $F_{43}$) may also be calculated. In this way it may be possible to determine if an observed wheel slip event is as a result of poor pedal control. For example, if a significant wheel slip event is observed to coincide with a peak in pedal position, then the slip event may have arisen as a result of poor driver pedal control. The analysis of driver behaviour is important when collating off-road route data obtained from a plurality of different drivers having differing off-road driving abilities, and enables erratic or inexperienced driving behaviour to be identified and prevented from unduly affecting any derived results, such as off-road route difficulty ratings. This improves the fidelity and accuracy with which off-road difficulty ratings may be determined and retained in the off-road route database 14.

A characteristic feature indicating whether an off-road cruise control system (denoted $F_{44}$), such as Land Rover's All Terrain Progress Control (ATPC), has been activated for a period of time in excess of a predetermined time threshold value may also be calculated. Such off-road control systems are typically configured to maintain low vehicle speeds in tough off-road conditions, enabling the driver to focus on steering and assessing hazards. The characteristic feature associated with the activation of the off-road cruise control system may be a binary value, indicating if the off-road cruise control system has been activated for a time period in excess of a predetermined threshold time period value.

In order to account for the different off-road capabilities between different vehicles, certain embodiments may comprise a characteristic feature associated with a vehicle capability index (denoted $F_{45}$) as mentioned previously.

The above described additional optional characteristic features are summarised in the below table.

TABLE 8

Additional Characteristic Features

| Feature $F_i$ | Definition |
|---|---|
| $F_{39}$ | Rain sensor binary indicator considering any activation for longer than threshold value |
| $F_{40}$ | Light sensor binary indicator considering any activation for longer than threshold value |
| $F_{41}$ | Pedal Position integral over time |
| $F_{42}$ | Pedal Position Max value |
| $F_{43}$ | Pedal Position Average value |
| $F_{44}$ | Off road cruise control (ATPC) binary indicator considering any activation for longer than threshold value |
| $F_{45}$ | Vehicle capability index accounting for differences between vehicles |

Time Series Data Management

As mentioned previously, in certain embodiments the captured vehicle sensor data may be divided into subsets of captured data. The subsets may represent equal intervals. For example, this may be done on the basis of time or distance, wherein each subset of captured vehicle sensor data relates to an equal time period or distance. Alternatively, the subset intervals may be selected to be non-uniform. The division into subsets may be carried out on the calculated characteristic features $F_1$ to $F_{38}$. It is to be appreciated that characteristic features $F_1$ to $F_{38}$ form a data time series and so the division may be carried out on the calculated characteristic feature time series directly, at step 54 of FIG. 3 for example.

Figure 4:
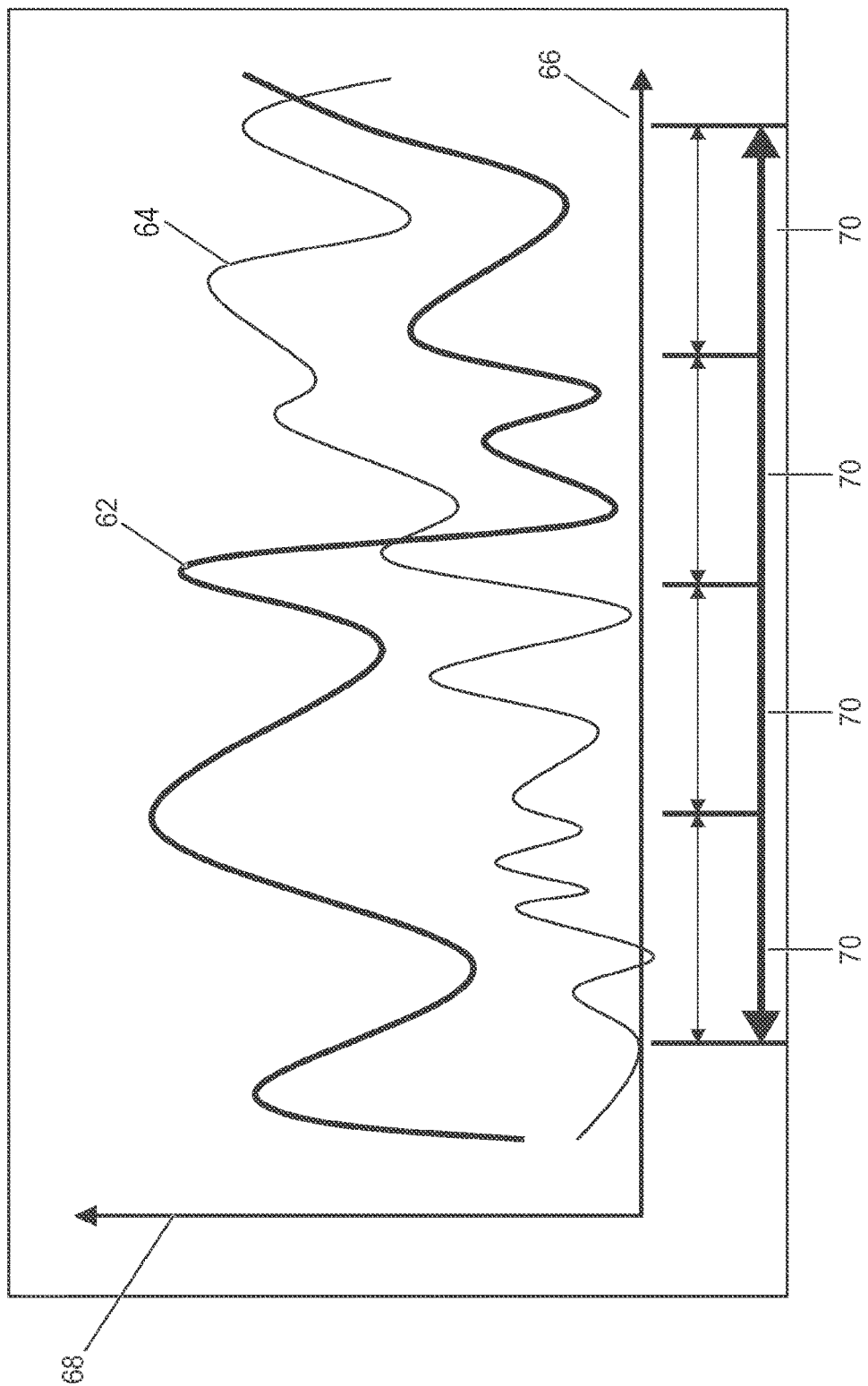
FIG. 4 is a data time series illustrating how a characteristic feature, calculated from vehicle sensor data, associated with the off-road route varies over time.

FIG. 4 illustrates two time series 62, 64 associated with two different calculated characteristic features. The x-axis 66 represents a time axis, and the y-axis 68 represents the magnitude of the characteristic feature. Accordingly, where the two characteristic features relate respectively to the estimated rolling resistance force (i.e. $RR_{est}$) and the estimated surface friction (i.e. $\mu_k$) time series, the y-axis 68 represents force. Each subdivision 70 represents an equal time period. Each subdivision is subsequently analysed and the required characteristic features derived therefrom. Where the data time series relate to the estimated rolling resistance force and surface friction, characteristic features $F_1$ through $F_6$ are calculated for each subset 70. In effect, each subset 70 is treated as if it were independent of the other subsets. Whilst FIG. 4 only displays the time series associated with estimated rolling resistance and surface friction for illustrative purposes, it is to be appreciated that in practice each subset 70 comprises the time series associated with each characteristic feature. The required features $F_1$ through $F_{38}$ are calculated for each subset and used to predict the terrain type that each subset 70 is associated with, as previously described in relation to step 56 of FIG. 3.

Predicting the terrain type that each subset 70 is associated with may comprise selecting one of seven different available terrain types: snow and ice; grass; gravel; mud and ruts; soft sand; rock crawl; and Tarmac® and others. This process may be carried out at step 56 of FIG. 3.

Terrain Classification

In accordance with an embodiment of the invention, one way in which the terrain type may be predicted from the calculated characteristic data is to associate a range of different values of the characteristic data with each type of terrain. This information may be stored in the memory 44 or remotely from the vehicle 2 but accessible to it, for example in the remotely located database 14. Associating each subset with the relevant terrain type may effectively require identifying the terrain type whose associated range of different characteristic data values includes the calculated characteristic data values comprised in the subject subset.

In yet a further embodiment, a softmax regression optimisation problem may be used to identify and classify the type of terrain associated with each subdivision. In such embodiments, it is envisaged that the softmax regression optimisation problem may be used to train a model based on labelled test data from the seven terrain categories. For example, given a terrain label "k" where k is an indices representing the terrain type, and having a value from 1 to 7, and calculated characteristic features $F_i$ where i can take values from 1 to 38, the probability of the type of terrain being identified and classified as k is given by the following equation as $$p(\text{Label} = k \mid F_i; \theta) = \frac{e^{\theta_i^T F^k}}{\sum_{l=1}^{7} e^{\theta_l^T F^k}} \quad \text{eq. 5}$$

The parameter $\theta$ is trained using an adequate set of test data for each type of terrain. It is to be noted that the addition of all the probabilities for any time series subset is always equal to 1. Classifying the terrain comprises selecting the terrain type associated with the highest probability from the softmax regression. If the detected terrain relates to tarmaced terrain, then the associated subset is ignored for the calculation of terrain difficulty, as mentioned previously.

In embodiments where the vehicle 2 comprises a terrain detection system, such as Land Rover's Auto Terrain Response system, then the terrain type may also be obtained from this system to compliment the terrain type selected using the softmax regression optimisation. Where the terrain type identified using the softmax regression differs to the terrain type obtained via the vehicle's terrain detection system, yet both identified terrain types relate to off-road terrain, then a terrain difficulty value is calculated for both terrain types and averaged. If any one of the identified terrain types relates to tarmaced terrain then this is ignored for the purposes of calculating the terrain difficulty value. If instead the terrain type identified using the softmax regression optimisation and the terrain type identified using the vehicle's terrain detection system are identical then the data sets may be merged for the purposes of calculating the associated terrain difficulty value.

Irrespective of which embodiment is adopted for the purposes of identifying the type of terrain traversed, data associated with tarmaced terrain is ignored for the purposes of determining terrain difficulty.

Determining Terrain Difficulty

In accordance with an embodiment of the invention, the identified terrain type is used to identify which characteristic features are to be included in the calculation of the associated terrain difficulty value. In particular, those characteristic features which are known to have very little impact on the difficulty rating associated with a specific type of off-road terrain, may be ignored. It is to be appreciated that in the calculation of terrain difficulty, characteristic features $F_{39}$ through $F_{45}$ are included in the calculation For example, where the identified terrain type is snow and ice, then characteristic features $F_7$ through $F_{13}$ are excluded from the terrain difficulty calculations, since it is known that terrain roughness does not contribute significantly to the difficulty of snow and ice covered terrain, thus in order to reduce the associated processing overhead in calculating the terrain difficulty value, these characteristic features are omitted from the calculation. All other characteristic features are included in the difficulty rating calculation.

Similarly, where the identified terrain type relates to grass, then characteristic features $F_1$ to $F_2$ and $F_7$ through $F_{13}$ are excluded from the terrain difficulty calculations, since these characteristics do not contribute significantly to the difficulty associated with traversing this type of terrain, whilst all other characteristic features are included.

For the remaining four terrain types (recall that data associated with a tarmaced road section is ignored) the following features are excluded, whilst all others are included: features $F_1$ to $F_2$ are excluded from the terrain difficulty calculations where the identified terrain type is gravel; features $F_{30}$ through $F_{38}$ are excluded from the terrain difficulty calculations where the identified terrain type is mud and ruts; features $F_7$ through $F_{13}$ are excluded from the terrain difficulty calculations where the identified terrain type is soft sand; and features $F_1$ through $F_2$ and $F_{30}$ through $F_{38}$ are excluded from the terrain difficulty calculations where the identified terrain type is rock crawling. These conditions are summarised in FIG. 5, in which a "1" indicates that the associated characteristic feature is included in the terrain difficulty rating calculation.

Once the terrain type has been identified, as previously described in relation to step 56 of FIG. 3, the required characteristic features are used to calculate the associated terrain difficulty value. In this regard, it is envisaged that the terrain difficulty value may take any value on a difficulty rating scale from 1 to 5 for example, where 1 is indicative of a relatively easy off-road route, and 5 is an extremely difficult off-road route. Alternatively, another scale having different dimensions may be used.

In certain embodiments the difficulty rating scale may be predefined for each terrain type. Each difficulty rating value may be associated with a predefined range of characteristic feature values. Calculating the difficulty rating associated with a particular terrain type requires matching the characteristic feature values present in the subset 70 to the best fitting difficulty rating value. This process is repeated for all the subsets 70 present in the off-road journey and for all the identified terrain types comprised therein. A difficulty rating for the entire off-road route may then be calculated as the average difficulty rating of the subsets 70 comprised in the route, or alternatively the largest difficulty rating associated with the subsets 70 may be selected as the difficulty rating associated with the off-road route. In other words, in the latter option the difficulty rating associated with the most difficult portion of an off-road route is selected as the difficulty rating of the entire off-road route. In this way, the driver is confident that an off-road route does not comprise any more difficult portions. In practice, often the driver will be interested in knowing the difficulty rating of the hardest portion of an off-road route, since this portion of the route presents the greatest hazard to the driver.

Figure 5:
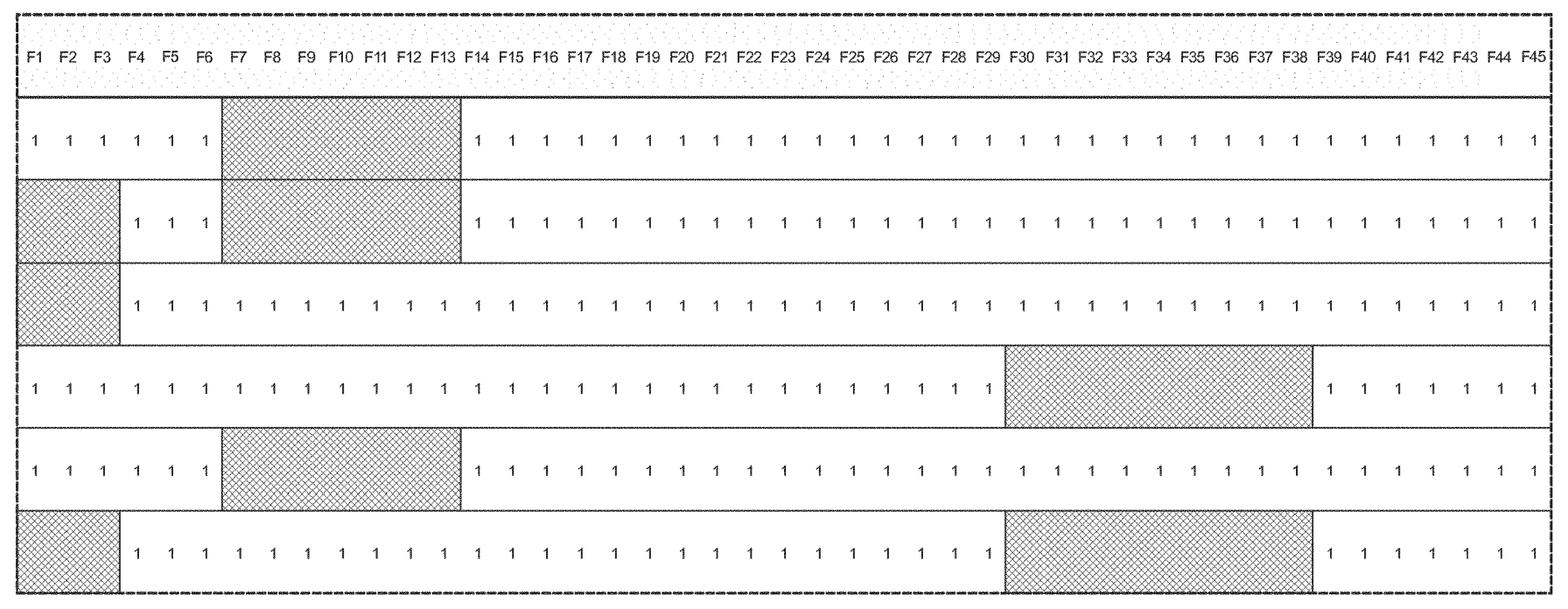
Figure 6:
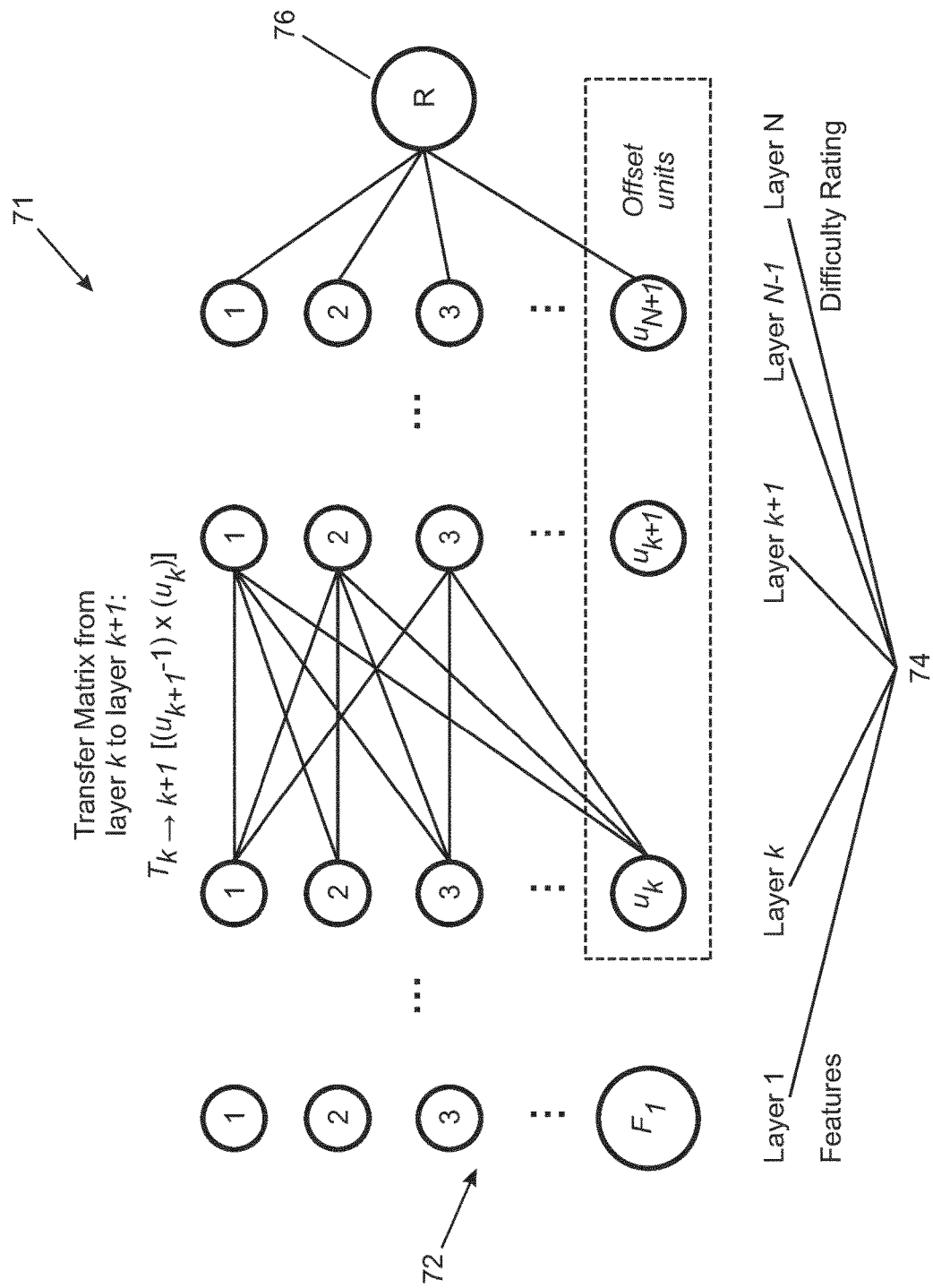
FIG. 6 is a graphical representation of a neural network used to calculate a difficulty rating associated with an off-road route, on the basis of calculated characteristic features of the traversed off-road terrain, in accordance with an embodiment of the invention.

In accordance with a further embodiment of the invention, a machine learning or multivariate statistical method can be used to calculate the terrain difficulty value. For example, in an embodiment, a deep learning neural network or a support vector machine (SVM) may be used to calculate the terrain difficulty value using the relevant characteristic features $F_j$ for the identified terrain type. In this regard, $F_j$ represents a subset of the total available characteristic features $F_1$ where j<i, since the number of selected characteristic features is chosen on the basis of the identified terrain type, as indicated in FIG. 5. For example, where the identified terrain type relates to snow and ice, characteristic features $F_7$ through $F_{13}$ are excluded from the difficulty rating calculations, and a total of 38 characteristic features are included in the difficulty rating calculation. FIG. 6 is a graphical illustration of the structure of such a neural network 71. In such embodiments it is envisaged that the neural network 71 utilises a total of $F_j$ features 72, and that the network comprises a total of N fully connected layers 74, e.g. 1, 2, ..., k, N−1, N and layer k is characterised by a number $u_k$ of neurons. Since the output of the network is a unique difficulty rating R 76, layer N has a unique neuron, which is R 76. In order to propagate information between inner layers, the following process may be followed:

1. Add an offset unit to the hidden layer;
2. Multiply the values by a transfer matrix between layer k and layer k+1 defined as $T_k$ having size $[(u_{k+1}-1) \times (u_k)]$;
3. Apply an activation function to the result as a Sigmoid function defined by $$S(x) = \frac{1}{1+e^{-x}}$$

In order to train the neural network 71, available data associated with known routes having known difficulty ratings is used. Training the neural network improves the accuracy with which it is able to calculate the difficulty rating associated with an off-road route. To this end, the greater the number of different sets of training data used, the better the accuracy with which the neural network is able to calculate the difficulty rating associated with an off-road route.

In certain embodiments it is envisaged that the neural network processing may be carried out local to the vehicle, for example in a processor local to the leading vehicle 2, such as by the ECU 38, or at a remote server 12 operatively coupled to the leading vehicle 2 via the shared communications network 16.

In yet further embodiments it is envisaged that the difficulty rating calculation may be carried out by the processor of a smartphone operatively coupled to the vehicle. In such embodiments it is envisaged that the characteristic data required for the difficulty rating calculation may be provided to the smartphone from the vehicle. Alternatively, the smartphone may be configured to calculate the characteristic data from sensor data forwarded to it by the vehicle.

In yet a further embodiment, the difficulty rating calculation may be carried out by the remotely located server 12, on the basis of sensor and/or characteristic feature data provided to it by a plurality of different operatively connected vehicles 2, 6, and the resulting difficulty rating stored in the networked database 14 for subsequent use by a plurality of drivers of different vehicles.

The parameters of machine learning or multivariate statistical method may be further calibrated. The calibration may use further training data obtained from engineers who gather necessary data and/or from users who wish to share their experience, for example, by sharing recording or sending an indication that recalibration is required. The parameters of machine learning or multivariate statistical method may be updated on the vehicle's controller (ECU) over the air (OTA) and/or through the connection with a mobile device. The mobile device will receive a patch release if an app is installed to accommodate the above described methods and systems.

It is envisaged that the herein described methods and systems may also be adopted for use by autonomous vehicles, and used for the purposes of off-road route selection, for example.

In certain embodiments in which off-road route data including but not limited to calculated characteristic features associated with the terrain and/or calculated difficulty ratings are collated within the off-road route database 14, a confidence value may be associated with each received route data. When the different off-road route data is collated an overall confidence value may be calculated for the collated off-road route data. The confidence value may provide a quantified measure of how confident one can be of the accuracy of the route data. In certain embodiments, the confidence value may be time dependent, such that the more time has lapsed since the off-road route data has been received, the lower the associated confidence value. In this regard the confidence value may be associated with an exponential rate of decay. In addition, when off-road route data relating to the same off-road route is received from different vehicles, the sets of received data may be analysed to determine if they are similar or widely divergent. Where the received data is widely divergent, then the overall confidence value associated with the collated off-road route data is proportionally lower than if the received data is substantially similar. Furthermore, a weighting factor may be applied when calculating the overall confidence value, configured to prioritise the most recently received route data, such that the contribution to the calculation of the overall confidence value of the more recently received route data is greater than the contribution provided by historical route data. This is advantageous since off-road terrain features and conditions are known to change with time. The use of a time-based weighting factor helps to compensate for such terrain changes.

It is also envisaged in certain embodiments, that where recently received off-road route data differs from existing off-road route data stored in the off-road route database 14, then the existing off-road route data may be amended to include the recently received data.

In yet a further embodiment it is envisaged that where the seasonal or current weather (derived from temperature, rain and/or pressure sensors for example, and date information) data associated with recently received off-road route data differs from pre-existing data stored in the database 14, then instead of updating or otherwise amending the pre-existing off-road route data, the latest received data is stored separately, In this way, the database 14 is able to collect different off-road data for the same off-road route, categorised by weather and/or seasonal conditions. This is particularly useful since the difficulty rating associated with an off-road route may vary significantly between different seasons, and/or for different weather conditions. It also ensures that any vehicle relying on off-road route data obtained from the shared off-road route database 14, is provided with the most accurate available data on the basis of current seasonal and/or weather conditions.

Figure 7:
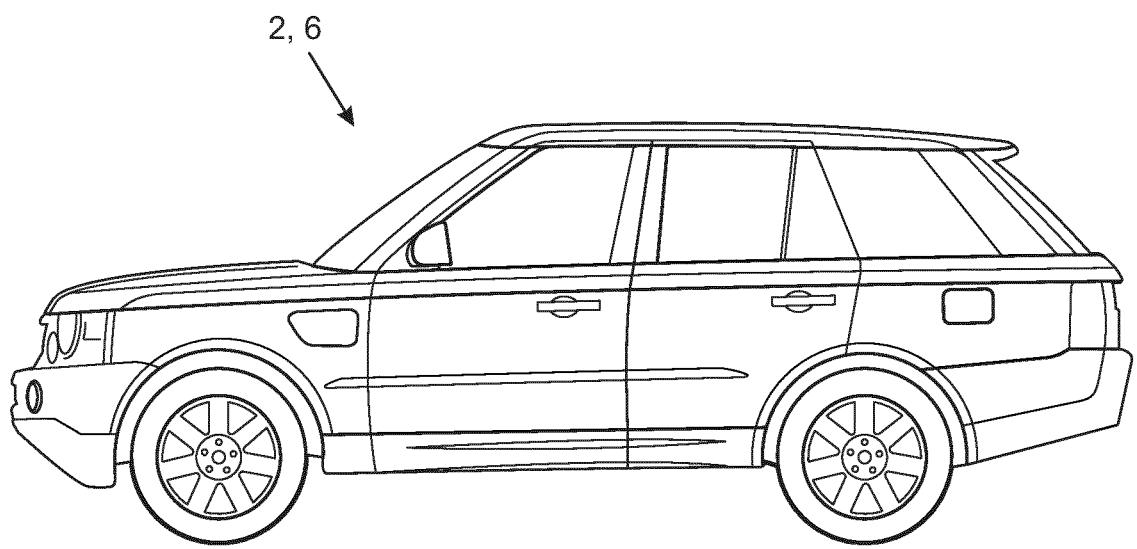
FIG. 7 shows a vehicle in accordance with embodiments of the present invention.

FIG. 7 shows a vehicle 2, 6 comprising a system for determining a difficulty rating associated with an off-road route (not shown in the figure).

Many modifications may be made to the above examples without departing from the scope of the present invention as defined in the accompanying claims.

The invention claimed is:

1. A method for determining a difficulty rating associated with an off-road route using a vehicle, the difficulty rating being indicative of the difficulty a vehicle experiences in traversing a terrain, the method comprising:
   receiving a request to determine the terrain difficulty;
   obtaining vehicle sensor data sampled over a preceding period of time while the vehicle was traversing the off-road route;
   analyzing the sampled sensor data and determining one or more characteristics associated with the sampled sensor data;
   predicting the type of terrain traversed by the vehicle on the basis of at least one of the one or more of the determined characteristics;
   calculating the difficulty rating using the one or more determined characteristics and the predicted terrain type;
   outputting a signal indicative of the difficulty rating of the off-road route; and
   transmitting a signal indicative of any one or more of the calculated difficulty rating and the one or more determined characteristics to a remotely located vehicle in operative communication with the vehicle.

2. The method of claim 1, further comprising:
   uploading any one or more of the calculated difficulty rating and the one or more determined characteristics to a remotely located storage device accessible by one or more remotely located vehicles.

3. The method of claim 1, further comprising:
   sampling the vehicle sensor data;
   associating the sampled sensor data with time information, wherein each sampled sensor data point is associated with a corresponding time coordinate associated with the time that the data point was sampled, such that the sensor data forms a data time series; and
   storing the sensor data in a memory device operatively coupled to the vehicle, for subsequent access.

4. The method of claim 3, further comprising:
   associating location information with the sensor data, such that each sampled data point comprised within the sensor data is associated with location information associated with the location where the sampled sensor data point was sampled.

5. The method of claim 1, wherein determining the one or more characteristics associated with the sampled sensor data comprises determining a roughness of the terrain comprised in the off-road route.

6. The method of claim 1, wherein a vehicle capability index indicative of the off-road capabilities of the vehicle is included in the difficulty rating calculation.

7. A method for determining a difficulty rating associated with an off-road route using a vehicle, the difficulty rating being indicative of the difficulty a vehicle experiences in traversing a terrain, the method comprising:
   receiving a request to determine the terrain difficulty;
   obtaining vehicle sensor data sampled over a preceding period of time while the vehicle was traversing the off-road route;
   analyzing the sampled sensor data and determining one or more characteristics associated with the sampled sensor data;
   predicting the type of terrain traversed by the vehicle on the basis of at least one of the one or more of the determined characteristics;
   calculating the difficulty rating using the one or more determined characteristics and the predicted terrain type; and
   outputting a signal indicative of the difficulty rating of the off-road route, wherein determining the one or more characteristics associated with the sampled sensor data comprises:
estimating a rolling resistance force experienced by one or more wheels of the vehicle, the rolling resistance being estimated by calculating a difference between a calculated tractive force experienced by the vehicle, the aerodynamic drag experienced by the vehicle, and the inertial resistance of the vehicle.

8. The method of claim 7, wherein the tractive force is calculated on the basis of the produced engine torque, a gearbox state of the vehicle, and a state of the vehicle's differential, and wherein any one or more of the produced engine torque, gearbox state, or differential state are obtained from an engine management unit or an electronic control unit comprised in the vehicle.

9. A method for determining a difficulty rating associated with an off-road route using a vehicle, the difficulty rating being indicative of the difficulty a vehicle experiences in traversing a terrain, the method comprising:
receiving a request to determine the terrain difficulty;
obtaining vehicle sensor data sampled over a preceding period of time while the vehicle was traversing the off-road route;
analyzing the sampled sensor data and determining one or more characteristics associated with the sampled sensor data;
predicting the type of terrain traversed by the vehicle on the basis of at least one of the one or more of the determined characteristics;
calculating the difficulty rating using the one or more determined characteristics and the predicted terrain type; and
outputting a signal indicative of the difficulty rating of the off-road route,
wherein analyzing the sampled sensor data and determining the one or more characteristics associated with the sampled sensor data comprises:
identifying one or more events associated with a loss of vehicle wheel traction in the sampled sensor data; and
estimating a surface friction value experienced by the vehicle immediately prior to the loss of vehicle wheel traction for the one or more identified events.

10. The method of claim 9, wherein the sampled vehicle sensor data comprises at least one selected from the following group:
longitudinal and lateral vehicle acceleration data, wherein the one or more events associated with the loss of wheel traction are identified by monitoring the lateral and longitudinal acceleration sensor data; and
data generated by a stability control system, wherein the one or more events associated with the loss of vehicle wheel traction are identified by monitoring the data generated by the stability control system.

11. A method for determining a difficulty rating associated with an off-road route using a vehicle, the difficulty rating being indicative of the difficulty a vehicle experiences in traversing a terrain, the method comprising:
receiving a request to determine the terrain difficulty;
obtaining vehicle sensor data sampled over a preceding period of time while the vehicle was traversing the off-road route;
analyzing the sampled sensor data and determining one or more characteristics associated with the sampled sensor data;
predicting the type of terrain traversed by the vehicle on the basis of at least one of the one or more of the determined characteristics;
calculating the difficulty rating using the one or more determined characteristics and the predicted terrain type; and
outputting a signal indicative of the difficulty rating of the off-road route,
wherein the sampled vehicle sensor data comprises at least one selected from the following group:
vehicle roll data, wherein determining the one or more characteristics associated with the sampled sensor data comprises determining a roll angle associated with the vehicle, the roll angle being associated with a side slope of the traversed terrain;
vehicle pitch data, wherein determining the one or more characteristics associated with the sampled sensor data comprises determining a pitch angle associated with the vehicle, the pitch angle being associated with a slope of the traversed terrain;
vehicle yaw data, wherein determining the one or more characteristics associated with the sampled sensor data comprises determining a yaw angle associated with the vehicle; and
ambient temperature data;
atmospheric pressure data;
rain sensor data;
ambient light sensor data; and
accelerator pedal position data.

12. A system for determining a difficulty rating associated with an off-road route, the difficulty rating being indicative of the difficulty a vehicle experiences in traversing a terrain, the system comprising:
one or more sensors arranged to capture sensor data regarding a state of the vehicle over a period of time as it traverses the off-road route;
a processor configured to:
receive and analyze the captured sensor data and determine one or more characteristics associated with the captured sensor data;
predict the type of terrain traversed by the vehicle on the basis of at least one of the one or more determined characteristics;
calculate the difficulty rating using the one or more determined characteristics and the predicted terrain type; and
output a signal indicative of the difficulty rating of the off-road route; and
a transmitter arranged to transmit a signal indicative of any one or more of the calculated difficulty rating and the one or more determined characteristics to a remotely located vehicle.

13. The system of claim 12, further comprising a location positioning system arranged to record location data of the vehicle whilst the vehicle traverses the off-road route; and wherein the processor is further arranged to associate the recorded location data with the captured sensor data.

14. The system of claim 12, wherein the characteristics associated with the captured sensor data comprise at least one selected from the following group:
rolling resistance force, wherein the processor is further arranged to receive vehicle engine torque data, vehicle gearbox data, and vehicle differential settings data from an Engine Management Unit of the vehicle or from an Electronic Control Unit of the vehicle, wherein the processor is further configured to:

calculate the torque delivered to the wheels of the vehicle using the vehicle engine torque data, the vehicle gearbox data and the differential settings;

convert the calculated torque delivered to the wheels of the vehicle into tractive force;

calculate the aerodynamic drag of the vehicle on the basis of the vehicle speed and the aerodynamic shape of the vehicle;

calculate the force of inertia of the vehicle on the basis of the vehicle's mass and acceleration; and calculate an estimated rolling resistance force experienced by the wheels of the vehicle, by subtracting the aerodynamic drag and force of inertia of the vehicle from the tractive force;

surface friction, wherein the processor is further arranged to receive data from a traction control system comprised in the vehicle, and longitudinal and lateral acceleration data from one or more accelerometers comprised in the vehicle, wherein the processor is further configured to:

identify one or more vehicle slip events associated with a loss of traction of the vehicle from the received traction control system data;

determine the lateral and longitudinal acceleration of the vehicle associated with each identified slip event; and calculate an estimate of the surface friction value experienced by the vehicle just prior to each identified slip event on the basis of the determined lateral and longitudinal acceleration of the vehicle associated with the slip event;

terrain roughness, wherein the processor is further configured to receive suspension displacement data from one or more suspension sensors comprised in the vehicle, and wherein the processor is further configured to:

determine vehicle cross articulation data from the received suspension displacement data, the cross articulation data being associated with a difference in the displacement of diametrically opposed vehicle suspension; and determine the roughness of the terrain on the basis of the determined cross articulation data;

vehicle roll angle, the roll angle being associated with a side slope of the traversed terrain, wherein the processor is further configured to receive accelerometer sensor data from one or more accelerometer sensors comprised in the vehicle, and wherein the processor is further configured to:

determine a vehicle roll angle from the received accelerometer sensor data;

determine the side slope on the basis of either or both the determined vehicle roll angle, and vehicle pitch angle, the pitch angle being associated with a slope of the traversed terrain, wherein the processor is further configured to receive accelerometer sensor data from one or more accelerometer sensors comprised in the vehicle;

determine a vehicle pitch angle from the received accelerometer sensor data; and determine the slope on the basis of the determined vehicle pitch angle; and vehicle yaw angle, wherein the processor is further configured to receive accelerometer sensor data from one or more accelerometer sensors comprised in the vehicle, and wherein the processor is further configured to determine a vehicle yaw angle from the received accelerometer sensor data.

15. The system of claim 12, wherein the characteristics associated with the captured sensor data comprise surface friction and accelerator pedal position data, and wherein the processor is further arranged to receive data from a traction control system comprised in the vehicle, and longitudinal and lateral acceleration data from one or more accelerometers comprised in the vehicle, and wherein the processor is further configured to:

identify one or more vehicle slip events associated with a loss of traction of the vehicle from the received traction control system data;

determine the lateral and longitudinal acceleration of the vehicle associated with each identified slip event;

calculate an estimate of the surface friction value experienced by the vehicle just prior to each identified slip event on the basis of the determined lateral and longitudinal acceleration of the vehicle associated with the slip event; and determine the accelerator pedal position associated with an identified vehicle slip event from pedal position data received from an Engine Management Unit of the vehicle.

16. The system of claim 12, wherein the system further comprises either or both a remotely located database arranged to receive the vehicle sensor data from the vehicle via a shared communications network and a mobile processing device arranged to receive the vehicle sensor data from the vehicle.

17. A vehicle comprising the system of claim 12.

* * * * *